(12) United States Patent
Murase

(10) Patent No.: US 9,057,297 B2
(45) Date of Patent: Jun. 16, 2015

(54) CONTROL APPARATUS FOR INTERNAL COMBUSTION ENGINE

(75) Inventor: Eiji Murase, Gotenba (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 414 days.

(21) Appl. No.: 13/699,693

(22) PCT Filed: May 25, 2010

(86) PCT No.: PCT/JP2010/058816
§ 371 (c)(1),
(2), (4) Date: Nov. 23, 2012

(87) PCT Pub. No.: WO2011/148461
PCT Pub. Date: Dec. 1, 2011

(65) Prior Publication Data
US 2013/0073180 A1    Mar. 21, 2013

(51) Int. Cl.
*F01N 3/00* (2006.01)
*F01N 3/01* (2006.01)
*F01N 9/00* (2006.01)

(52) U.S. Cl.
CPC .. *F01N 3/01* (2013.01); *F01N 9/00* (2013.01); *F01N 2240/28* (2013.01);
(Continued)

(58) Field of Classification Search
CPC ........... B01D 2259/818; B01D 53/323; B01D 53/885; B01D 2258/012; F01N 2240/28; F01N 13/0097; F01N 13/009; F01N 2570/14; F01N 3/2066; F01N 3/2882; F01N 2560/025; F01N 3/0814; F01N 3/0821; F01N 3/01
USPC .......................... 60/273–276, 282, 292–303; 701/102–105
See application file for complete search history.

(56) References Cited

U.S. PATENT DOCUMENTS 3,974,412 A * 8/1976 Pratt, Jr. .................... 313/131 R
5,061,462 A * 10/1991 Suzuki ..................... 422/186.04
(Continued)

FOREIGN PATENT DOCUMENTS

JP    7 247827     9/1995
JP    2001 159309   6/2001
(Continued)

OTHER PUBLICATIONS

International Preliminary Report on Patentability Issued Dec. 13, 2012 in PCT/JP10/058816 Filed May 25, 2010.
(Continued)

*Primary Examiner* — Stephen K Cronin
*Assistant Examiner* — Joseph Dallo
(74) *Attorney, Agent, or Firm* — Oblon, McClelland, Maier & Neustadt, L.L.P.

(57) ABSTRACT

An object of this invention is to appropriately control the state of a corona discharge in accordance with an exhaust air-fuel ratio, and always purify particulate matter (PM) in exhaust gas efficiently. An engine is equipped with a corona discharge-type exhaust emission control device. The exhaust emission control device purifies PM in exhaust gas by generating a corona discharge between a center electrode and an earth electrode. When the air-fuel ratio is in a rich region, an ECU controls an applied voltage that is applied between the electrodes. It is thereby possible to obtain a maximum PM purification rate while preventing an arc discharge. When the air-fuel ratio is in a lean region, a discharge current flowing between the electrodes is controlled. It is thereby possible to suppress power consumption while compensating for a decrease in the PM purification rate caused by a reduction in the PM amount in the exhaust gas.

12 Claims, 15 Drawing Sheets

(52) U.S. Cl.
CPC ........ *F01N 2900/08* (2013.01); *F01N 2900/14* (2013.01); *F01N 2900/1402* (2013.01); *Y02T 10/20* (2013.01); *Y02T 10/47* (2013.01)

(56) References Cited

U.S. PATENT DOCUMENTS

| | | | |
|---|---|---|---|
| 5,893,267 A * | 4/1999 | Vogtlin et al. | 60/274 |
| 6,029,442 A * | 2/2000 | Caren et al. | 60/275 |
| 6,038,853 A * | 3/2000 | Penetrante et al. | 60/274 |
| 6,047,543 A * | 4/2000 | Caren et al. | 60/275 |
| 6,321,531 B1 * | 11/2001 | Caren et al. | 60/275 |
| 7,966,810 B2 * | 6/2011 | Ito et al. | 60/285 |
| 2002/0127151 A1 | 9/2002 | Takeshima et al. | |
| 2003/0066285 A1 * | 4/2003 | Raybone et al. | 60/275 |
| 2003/0170154 A1 * | 9/2003 | Inman et al. | 422/186.04 |
| 2004/0129241 A1 * | 7/2004 | Freen | 123/143 B |
| 2004/0134469 A1 * | 7/2004 | Tamol, Sr. | 123/538 |
| 2004/0219084 A1 * | 11/2004 | Hall et al. | 423/235 |
| 2005/0224022 A1 * | 10/2005 | Heckel et al. | 123/41.86 |
| 2005/0224023 A1 * | 10/2005 | Heckel et al. | 123/41.86 |
| 2006/0037567 A1 * | 2/2006 | Thomas | 123/56.7 |
| 2009/0038300 A1 * | 2/2009 | Naito et al. | 60/303 |
| 2009/0229247 A1 * | 9/2009 | Ito et al. | 60/274 |
| 2010/0078000 A1 * | 4/2010 | Sakamoto | 123/672 |
| 2010/0293921 A1 * | 11/2010 | Yamato et al. | 60/273 |

FOREIGN PATENT DOCUMENTS

| | | |
|---|---|---|
| JP | 2002 266626 | 9/2002 |
| JP | 2006 29132 | 2/2006 |
| JP | 2006 112383 | 4/2006 |
| JP | 2007 51608 | 3/2007 |
| JP | 2009 243419 | 10/2009 |

OTHER PUBLICATIONS

International Search Rerport Issued Sep. 7, 2010 in PCT/JP10/058816 Filed May 25, 2010.

* cited by examiner

CONTROL APPARATUS FOR INTERNAL COMBUSTION ENGINE

TECHNICAL FIELD

The present invention relates to a control apparatus for an internal combustion engine, and more particularly to a control apparatus for an internal combustion engine that is equipped with a corona discharge-type exhaust emission control device.

BACKGROUND ART

A conventional control apparatus for an internal combustion engine that is equipped with a corona discharge-type exhaust emission control device is known, as disclosed, for example, in Patent Literature 1 (Japanese Patent Laid-Open No. 2009-243419). The aforementioned exhaust emission control device burns particulate matter (PM) contained in exhaust gas by generating a corona discharge in the exhaust gas. According to the conventional technology, energy that is introduced into the exhaust gas by a corona discharge is set so as to be equal to or greater than an activation energy required for burning (oxidation) of PM, and thus PM is efficiently purified.

CITATION LIST

Patent Literature

Patent Literature 1: Japanese Patent Laid-Open No. 2009-243419

SUMMARY OF INVENTION

Technical Problem

In the above described conventional technology, a configuration is adopted that controls energy that is introduced at a time of a corona discharge so that the introduced energy is equal to or greater than the oxidation energy of the PM. However, the PM purification capability also changes depending on an exhaust air-fuel ratio at the time of a corona discharge. In this respect, since the conventional technology does not take the exhaust air-fuel ratio into consideration, there is the problem that, depending on the operating state of the engine, in some cases the control of the introduced energy is incompatible with the exhaust air-fuel ratio, and thus the PM purification capability cannot be stably exerted.

The present invention has been conceived to solve the above described problem, and an object of the present invention is to provide a control apparatus for an internal combustion engine that is capable of appropriately controlling the state of a corona discharge in accordance with an exhaust air-fuel ratio, and can always purify PM contained in exhaust gas in an efficient manner.

Means for Solving the Problem

A first aspect of the present invention is a control apparatus for an internal combustion engine, comprising:
an exhaust emission control device that includes a corona discharge portion that generates a corona discharge in an exhaust passage of the internal combustion engine, and that purifies particulate matter contained in exhaust gas by a corona discharge;
air-fuel ratio detection means that detects an exhaust air-fuel ratio; and
electricity supply control means that supplies electricity to the corona discharge portion of the exhaust emission control device, and controls a state of an electricity supply to the corona discharge portion based on the exhaust air-fuel ratio.

In a second aspect of the present invention, wherein the electricity supply control means comprises applied voltage control means that, in a rich region in which the exhaust air-fuel ratio is on a rich side of a theoretical air-fuel ratio, controls an applied voltage that is applied to the corona discharge portion.

In a third aspect of the present invention, wherein the applied voltage control means is configured to lower the applied voltage as the exhaust air-fuel ratio becomes richer within the rich region.

In a fourth aspect of the present invention, wherein the electricity supply control means comprises discharge current control means that, in a lean region in which the exhaust air-fuel ratio is on a lean side of a theoretical air-fuel ratio, controls a discharge current that flows to the corona discharge portion.

In a fifth aspect of the present invention, wherein the discharge current control means is configured to decrease the discharge current as the exhaust air-fuel ratio becomes leaner within the lean region.

In a sixth aspect of the present invention, wherein the discharge current control means has an air-fuel ratio boundary value that is a predetermined air-fuel ratio within the lean region, and is configured to increase the discharge current as the exhaust air-fuel ratio becomes leaner in a case where the exhaust air-fuel ratio is between the theoretical air-fuel ratio and the air-fuel ratio boundary value, and to decrease the discharge current as the exhaust air-fuel ratio becomes leaner in a case where the exhaust air-fuel ratio is on a lean side of the air-fuel ratio boundary value.

In a seventh aspect of the present invention, further comprising:
PM amount calculation means that calculates a PM amount that is an amount of particulate matter contained in exhaust gas, based on at least an exhaust air-fuel ratio, an engine temperature, and a fuel injection timing;
wherein the applied voltage control means is configured to calculate the applied voltage based on the PM amount.

In a eighth aspect of the present invention, further comprising:
discharge current estimation means that estimates a discharge current that flows when an assumed voltage is applied to the corona discharge portion, based on at least the assumed voltage and the PM amount;
wherein the applied voltage control means is configured to calculate an assumed voltage at a time that an estimated value of the discharge current satisfies a required value that is necessary for purification of particulate matter as an actual applied voltage.

In a ninth aspect of the present invention, further comprising arc discharge prevention means that limits an applied voltage that is applied to the corona discharge portion to a voltage range in which an arc discharge does not occur.

In a tenth aspect of the present invention, further comprising:
PM amount calculation means that calculates a PM amount that is an amount of particulate matter contained in exhaust gas, based on at least an exhaust air-fuel ratio, an engine temperature, and a fuel injection timing; and
discharge distance calculation means that, in a case where an assumed voltage is applied between two electrodes comprising the corona discharge portion, calculates a range of a discharge that arises from one of the electrodes towards another of the electrodes, based on at least the assumed voltage and the PM amount;

wherein the arc discharge prevention means is configured to limit the applied voltage based on an assumed voltage at a time that the range of the discharge becomes equal to an inter-electrode distance between the respective electrodes.

Advantageous Effects of Invention

According to the first invention, the electricity supply control means can appropriately control the state of an electricity supply (applied voltage and discharge current) to an exhaust emission control device in accordance with a tendency of a PM purification rate or a tendency regarding the probability of occurrence of an arc discharge or the like in respective air-fuel ratio regions. Accordingly, in a wide air-fuel ratio region that extends from a rich region to a lean region, a state of a corona discharge can be appropriately controlled, and a PM purification rate can be stably improved while preventing an arc discharge.

According to the second invention, in a rich region, since the amount of PM contained in the exhaust gas is large, it is easier for a discharge current to flow by utilizing the PM as a medium, and hence an arc discharge is liable to occur. Consequently, in the rich region, it is difficult to accurately control a discharge current while avoiding the occurrence of an arc discharge. Therefore, in the rich region, the applied voltage control means can prevent an arc discharge by controlling an applied voltage, and the PM purification rate can be improved within a range in which an arc discharge does not occur.

According to the third invention, in the rich region, there is a characteristic that the richer the air-fuel ratio becomes, the easier it is for an arc discharge to occur. Therefore, the applied voltage control means can lower an applied voltage by an amount that corresponds to an amount by which the air-fuel ratio has become richer, and thereby prevent an arc discharge. Further, the amount by which the applied voltage is lowered in accordance with the air-fuel ratio can be suppressed to a minimum, and the PM purification rate can be improved.

According to the fourth invention, in a lean region, since a PM amount in exhaust gas (amount of PM generated by combustion) is small, it is difficult for a discharge current to flow by utilizing the PM as a medium, and the probability of occurrence of an arc discharge decreases. Therefore, in the lean region, the discharge current control means can easily perform control of the discharge current. Further, according to the control of the discharge current, the discharge current can be controlled to a current that has an approximately proportional relationship with the PM purification rate, and the PM purification rate can be accurately and easily maximized.

According to the fifth invention, in the lean region in which the amount of PM contained in exhaust gas is small, even if the discharge current is decreased, the discharge amount of PM can be adequately suppressed. Therefore, the discharge current control means decreases the discharge current in accordance with the degree to which the air-fuel ratio becomes leaner, and can reduce the discharge amount of PM using the minimum required energy. Accordingly, the power consumption of the exhaust emission control device can be suppressed and purification of PM can be efficiently performed.

According to the sixth invention, in a region (slightly lean region) in which the air-fuel ratio is between a theoretical air-fuel ratio and an air-fuel ratio boundary value, there is a characteristic that the PM purification rate rapidly decreases. Therefore, in the slightly lean region, by increasing the discharge current as the air-fuel ratio becomes leaner, it is possible to compensate for the characteristic that the PM purification rate rapidly decreases. In contrast, in a region (severely lean region) in which the air-fuel ratio is on the lean side of the air-fuel ratio boundary value, since the generated amount of PM is extremely small, even if the discharge current is decreased, the discharge amount of PM can be reduced. Therefore, in the severely lean region, the discharge current can be decreased as the air-fuel ratio becomes leaner, and power consumption of the exhaust emission control device can be suppressed.

According to the seventh invention, the applied voltage control means can calculate an applied voltage based on a PM amount contained in exhaust gas. It is thereby possible to reflect the state of parameters including a required applied energy that is necessary to oxidize the PM contained in the exhaust gas, an air-fuel ratio, an engine temperature, a fuel injection timing and the like in the voltage that is applied, and the applied voltage can be appropriately controlled in accordance with the respective parameters.

According to the eighth invention, the discharge current estimation means can estimate a discharge current based on an assumed voltage that it is intended to apply and a PM amount. Thus, the applied voltage control means can adjust the applied voltage based on the estimated discharge current before applying the actual voltage, and the applied voltage can be optimized so that an applied energy of an amount that is necessary and sufficient with respect to the PM amount contained in the exhaust gas is imparted. Accordingly, a situation in which the applied energy is insufficient or energy of an amount that is more than necessary is applied at the time of a corona discharge can be prevented, and PM can be efficiently purified while suppressing power consumption.

According to the ninth invention, the arc discharge prevention means can limit an applied voltage to a voltage range in which an arc discharge does not occur. Thus, inefficient control that lowers an applied voltage after an arc discharge has occurred is unnecessary, and PM can be efficiently purified while preventing an arc discharge from occurring.

According to the tenth invention, the arc discharge prevention means can limit an applied voltage based on an assumed voltage at a time that a range of a discharge becomes equal to an inter-electrode distance between the electrodes. Thus, before applying the actual voltage, a voltage that it is intended to apply can be set to a maximum voltage value within a range in which an arc discharge does not occur. Therefore, the maximum PM purification rate can be obtained while preventing an arc discharge from occurring.

DESCRIPTION OF EMBODIMENTS

Embodiment 1

Configuration of Embodiment 1

Figure 1:
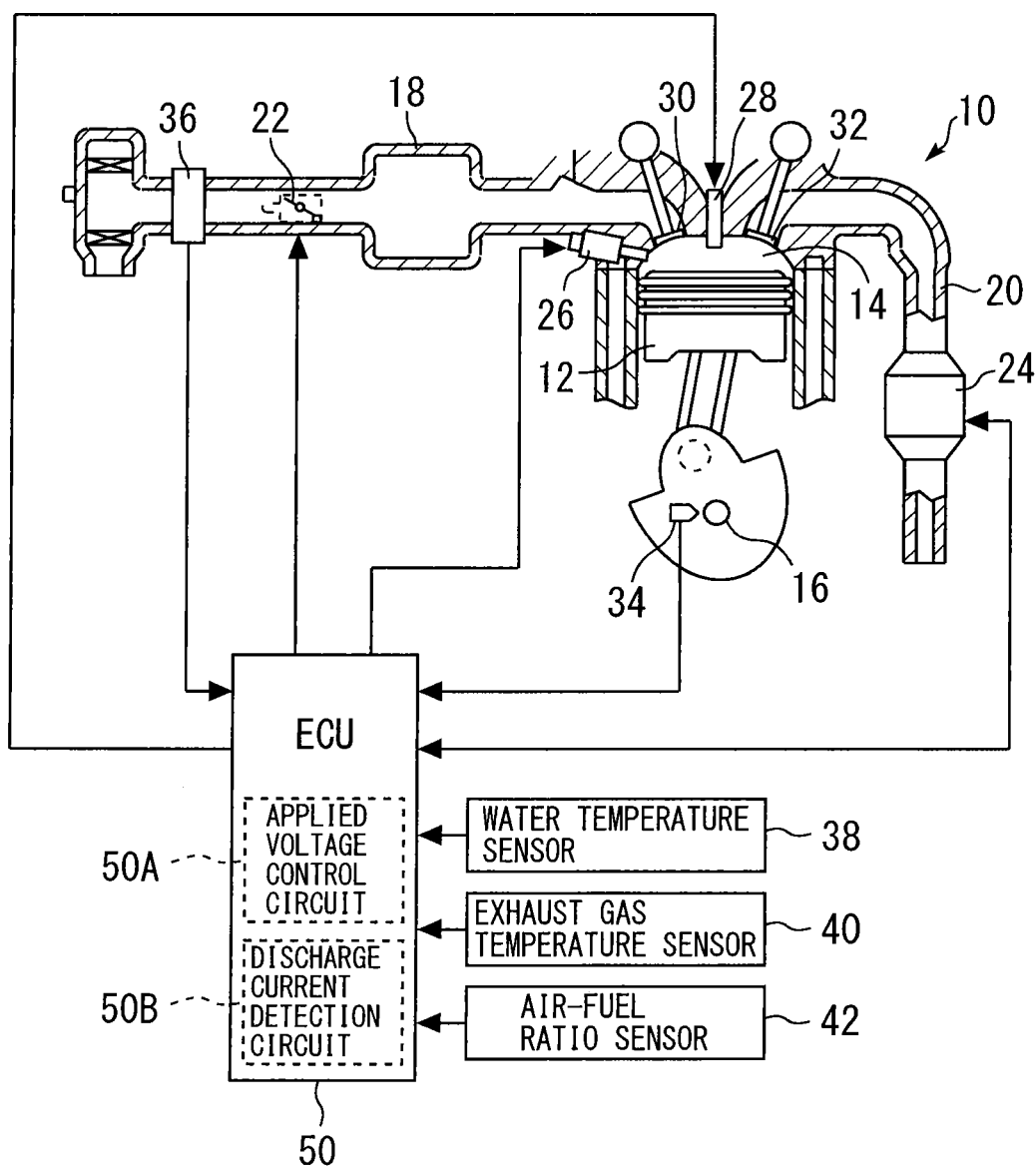
FIG. 1 is an overall configuration diagram for describing the system configuration of Embodiment 1 of the present invention.

Hereunder, Embodiment 1 of the present invention is described with reference to FIGS. 1 to 9. FIG. 1 is an overall configuration diagram for describing the system configuration of Embodiment 1 of the present invention. The system of the present embodiment includes a direct-injection type engine 10 as an internal combustion engine. In each cylinder of the engine 10, a combustion chamber 14 is defined by a piston 12, and the piston 12 is connected to a crankshaft 16 that is an output shaft of the engine 10. The engine 10 also includes an intake passage 18 that draws intake air into each cylinder, and an exhaust passage 20 through which exhaust gas is discharged from each cylinder. The intake passage 18 is connected to an intake port of each cylinder, and the exhaust passage 20 is connected to an exhaust port of each cylinder.

An electronically controlled throttle valve 22 that adjusts an intake air amount based on a degree of accelerator opening or the like is provided in the intake passage 18. A corona discharge-type exhaust emission control device 24 that purifies particulate matter (PM) contained in exhaust gas is provided in the exhaust passage 20. The structure of the exhaust emission control device 24 is described later with reference to FIG. 2. Each cylinder is provided with an in-cylinder fuel injection valve 26 that injects fuel into the combustion chamber 14 (into the cylinder), a spark plug 28 that ignites an air-fuel mixture in the cylinder, an intake valve 30 that opens and closes the intake port, and an exhaust valve 32 that opens and closes the exhaust port.

The system of the present embodiment also includes a sensor system, and an ECU (Electronic Control Unit) 50 that controls an operating state of the engine 10. The sensor system includes a crank angle sensor 34, an airflow sensor 36, a water temperature sensor 38, an exhaust gas temperature sensor 40, an air-fuel ratio sensor 42 and the like. First, the sensor system will be described. The crank angle sensor 34 outputs a signal that is synchronous with rotation of the crankshaft 16. The airflow sensor 36 detects an intake air amount. The water temperature sensor 38 detects the temperature of engine cooling water (engine water temperature) as the engine temperature of the engine 10, and the exhaust gas temperature sensor 40 detects the exhaust gas temperature. The air-fuel ratio sensor 42 detects an exhaust air-fuel ratio (hereunder, referred to simply as "air-fuel ratio") on an upstream side of the exhaust emission control device 24, and constitutes air-fuel ratio detection means of the present embodiment.

In addition to the aforementioned sensors 34 to 42, the sensor system also includes various sensors that are required for control of the engine 10 and the vehicle in which the engine 10 is mounted (for example, an accelerator opening degree sensor that detects the degree of opening of an accelerator and the like). These sensors are connected to an input side of the ECU 50. Various actuators including the throttle valve 22, the exhaust emission control device 24, the in-cylinder fuel injection valve 26, and the spark plug 28 are connected to an output side of the ECU 50.

The ECU 50 executes operation control by driving each actuator while detecting operating information of the engine by means of the sensor system. More specifically, the ECU 50 detects the number of engine revolutions and the crank angle based on the output of the crank angle sensor 34, and calculates an intake air amount based on the output of the airflow sensor 36. The ECU 50 also calculates the load of the engine (load factor) based on the intake air amount and the number of engine revolutions and the like, and determines the fuel injection timing and the like based on the crank angle. The ECU 50 calculates a fuel injection amount based on the intake air amount and the load and the like. When a fuel injection timing is reached, the ECU 50 drives the in-cylinder fuel injection valve 26, and thereafter drives the spark plug 28. Thus, an air-fuel mixture inside the cylinder can be burned to operate the engine 10.

As described later, the ECU 50 controls the state of an electricity supply to the exhaust emission control device 24 based on the air-fuel ratio and the like. For this purpose, the ECU 50 includes an applied voltage control circuit 50A that controls an applied voltage V that is applied between electrodes 62 and 64 of the exhaust emission control device 24, and a discharge current detection circuit 50B that detects a discharge current I that flows between the electrodes 62 and 64.

Figure 2:
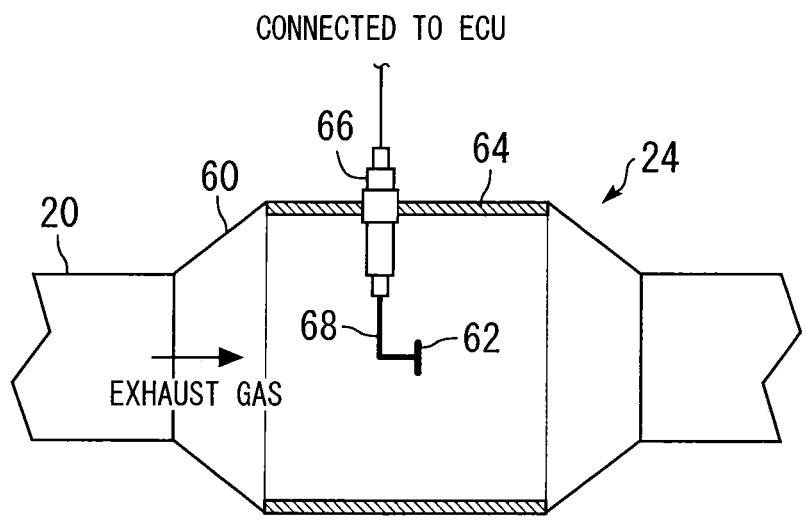
FIG. 2 is a cross-sectional view showing a corona discharge-type exhaust emission control device.

Next, the configuration of the exhaust emission control device 24 is described referring to FIG. 2. FIG. 2 is a cross-sectional view showing a corona discharge-type exhaust emission control device. The exhaust emission control device 24 purifies PM (particulates on a nano/micron scale) contained in exhaust gas by utilizing a corona discharge, and for example, has approximately the same configuration as the exhaust emission control device described in Japanese Patent Laid-Open No. 2009-243419. More specifically, as shown in FIG. 2, the exhaust emission control device 24 includes a cylindrical housing 60 that constitutes a part of the exhaust passage 20, a center electrode 62 disposed at a center position inside the housing 60, and a cylindrical earth electrode 64 that is provided on an inner circumference side of the housing 60. The center electrode 62 is supported by a narrow cylinder-shaped insulator 66 that penetrates a peripheral wall of the housing 60 and extends in a radial direction, and a rod-shaped electrode support portion 68 that is insertedly fitted to the inner circumference side of the insulator 66.

The center electrode 62 is formed in a substantially disk shape, and a plurality of protrusions are provided in a radial pattern on an outer edge portion thereof The electrode support portion 68 protrudes in the radial direction from the peripheral wall portion of the housing 60 as far as the center position. A distal end portion of the electrode support portion 68 bends in a substantially L shape. The center electrode 62 is adhered to the aforementioned distal end portion. The center electrode 62 is connected to the output side of the ECU 50 through the electrode support portion 68 and the like. The earth electrode 64 is earthed to the vehicle body or the like in a state in which the earth electrode 64 is insulated from the center electrode 62 through the insulator 66. According to the above described configuration, the center electrode 62 and the earth electrode 64 face each other in the radial direction of the housing 60, and a gap of a predetermined size is formed between the electrodes 62 and 64 in an even manner over the entire circumference thereof The electrodes 62 and 64 constitute a corona discharge portion of the present embodiment.

Next, the basic operations of the exhaust emission control device 24 are described. While the engine is operating, exhaust gas circulates through the inside of the housing 60 (earth electrode 64). At such time, if a voltage is applied to the center electrode 62 by the ECU 50, a corona discharge occurs around the center electrode 62 in accordance with the voltage that is applied between the electrodes 62 and 64. Since the electrons discharged by the corona discharge have a high energy, the electrons easily ionize oxygen in the exhaust gas, and generate oxygen ions (oxygen radicals) in which the chemical activity is high. Since PM (carbon) in the exhaust gas is oxidized by reaction with the oxygen radicals and becomes $CO_2$, the PM can be purified by the corona discharge.

Feature of Embodiment 1

At the time of operation of the exhaust emission control device 24, it is preferable to appropriately control an applied voltage that is applied between the electrodes 62 and 64 and a discharge current that flows between the electrodes 62 and 64, and maintain a high PM purification rate. Here, the term "PM purification rate" refers to a rate that shows a proportion of a purified PM amount when, for example, a PM amount in a case in which purification treatment is not performed is taken as a reference. The applicants discovered that there is a correlation between the PM purification rate and the air-fuel ratio, and performed experiments to determine the correlation. The experiments confirmed that, as shown in FIG. 3, there is a phenomenon that the PM purification rate decreases as air-fuel ratio becomes leaner.

Figure 3:
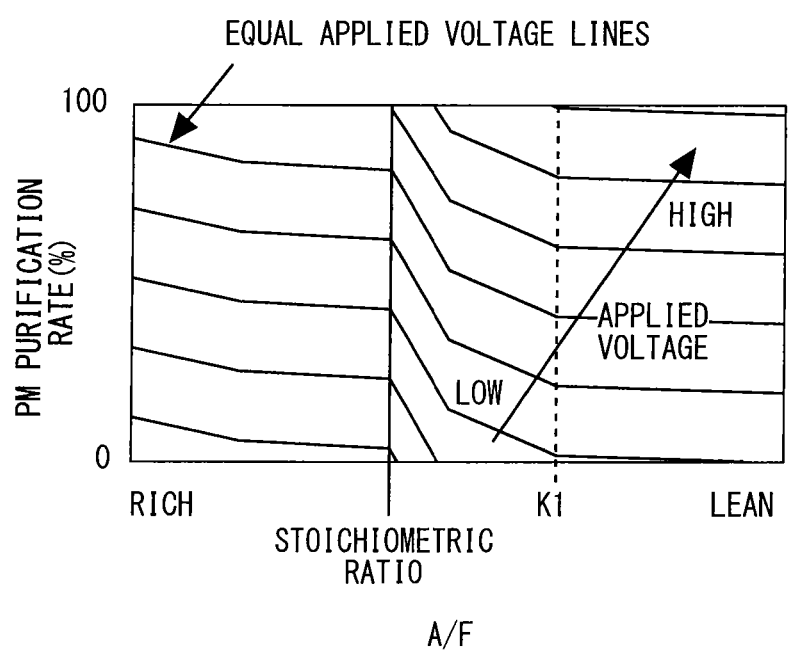
FIG. 3 is a characteristics diagram that illustrates the relationship between the exhaust air-fuel ratio (A/F) and the PM purification rate for respective applied voltages.

FIG. 3 is a characteristics diagram that illustrates the relationship between the exhaust air-fuel ratio (A/F) and the PM purification rate for respective applied voltages. FIG. 3 shows a plurality of characteristic lines (equal applied voltage lines) obtained in a state in which voltages applied between the electrodes 62 and 64 were set as respectively different fixed values. As shown in FIG. 3, the PM purification rate decreases as the air-fuel ratio becomes leaner, even in a state in which the applied voltage is fixed. The reason the PM purification rate decreases on the lean side is presumed to be as follows. First, when the air-fuel ratio becomes lean, since the generated amount of PM that is generated by combustion in the cylinders decreases, a discharge current that flows by employing an oxidation reaction of PM at the time of a corona discharge as a medium decreases. It is considered that as a result, the amount of PM that is oxidized in a chain reaction by the action of the discharge current decreases and therefore the PM purification rate decreases.

Figure 4:
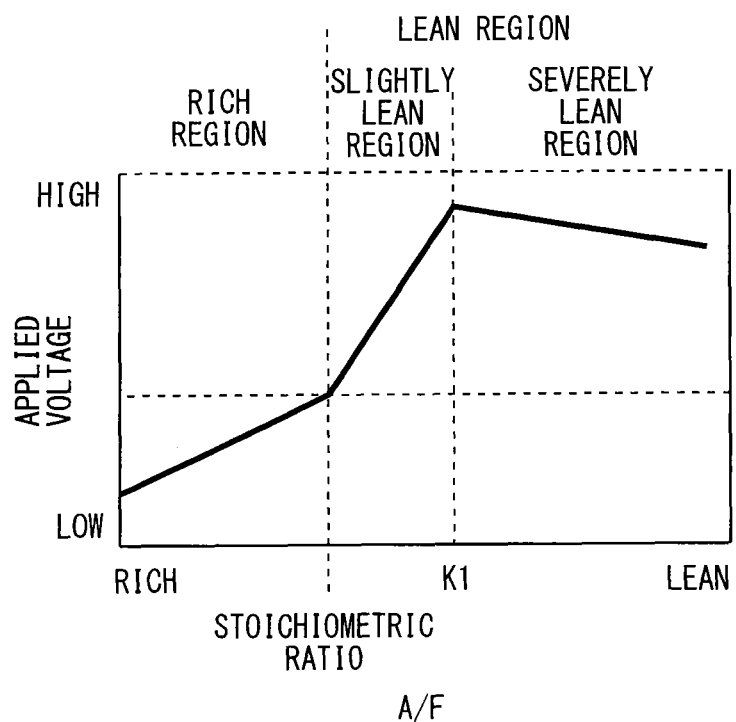
FIG. 4 is a characteristics diagram that shows the relationship between the applied voltage and the exhaust air-fuel ratio that is realized by control of the ECU.
Figure 5:
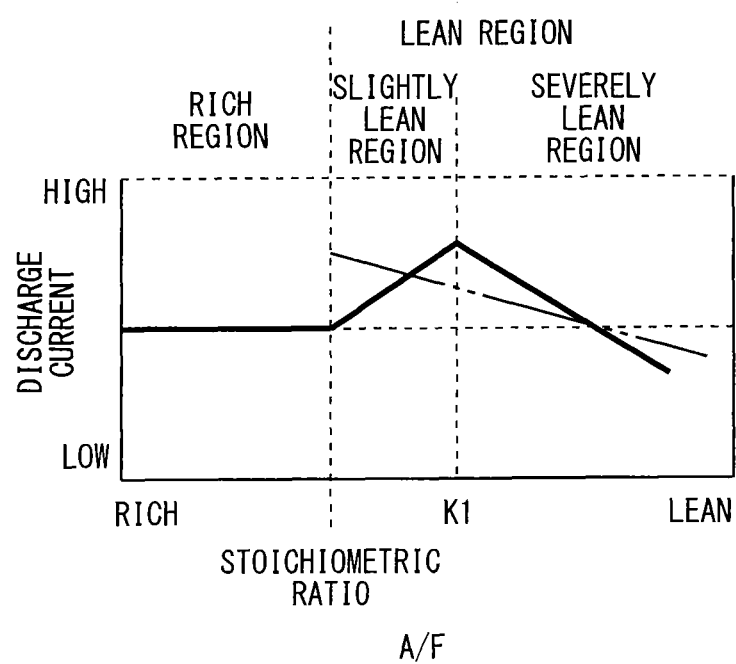
FIG. 5 is a characteristics diagram that shows the relationship between the discharge current and the exhaust air-fuel ratio.

Since the PM purification rate varies depending on the operating state (air-fuel ratio) of the engine in this manner, according to the present embodiment a configuration is adopted that controls the state of the electricity supply to the electrodes 62 and 64 based on at least the air-fuel ratio. More specifically, in the present embodiment, applied voltage control is executed when the air-fuel ratio is in a region (hereunder referred to as "rich region") that is on a rich side of the stoichiometric ratio (theoretical air-fuel ratio). Further, discharge current control is executed when the air-fuel ratio is in a region (hereunder referred to as "lean region") that is on a lean side of the stoichiometric ratio. That is, a feature of the present embodiment is that control is switched to either one of applied voltage control and discharge current control based on the air-fuel ratio. These kinds of control are described hereunder referring to FIG. 4 and FIG. 5. FIG. 4 is a characteristics diagram that shows the relationship between the applied voltage and the exhaust air-fuel ratio that is realized by control of the ECU. FIG. 5 is a characteristics diagram that shows the relationship between the discharge current and the exhaust air-fuel ratio.

(Applied Voltage Control)

The applied voltage control is executed in the rich region, and controls the applied voltage V that is applied between the electrodes 62 and 64 to a target voltage value. In the rich region, since there is a large amount of PM contained in the exhaust gas, it is easy for a discharge current to flow by utilizing the PM as a medium. Since the discharge current and the PM purification rate are in a substantially proportional relationship, theoretically the maximum PM purification rate can be obtained by raising the applied voltage to increase the discharge current. However, in the rich region, an arc discharge that does not contribute to oxidation of PM is liable to occur to an extent that corresponds to the degree by which it is easier for the discharge current to flow. More specifically, if an applied voltage or a discharge current is increased carelessly, an arc discharge occurs before the PM purification rate becomes the maximum rate as the result of a corona discharge, and there is a high possibility that the PM purification rate will be almost zero. Furthermore, since a discharge current also fluctuates in accordance with, for example, the PM amount contained in the exhaust gas, the exhaust gas temperature and the like, it is difficult to accurately control the discharge current while avoiding the occurrence of an arc discharge.

Therefore, in the rich region, by executing applied voltage control, the applied voltage is controlled so to be as high a value as possible within a voltage range in which an arc discharge does not occur. The probability of the occurrence of an arc discharge is determined based on the applied voltage and the air-fuel ratio (when other conditions are constant). In addition, the richer the air-fuel ratio is, or the higher the applied voltage is, the easier it is for an arc discharge to occur. Therefore, in the applied voltage control, as shown in the rich region in FIG. 4, the applied voltage is lowered as the air-fuel ratio becomes richer. The amount of the voltage decrease at this time is set so that the maximum PM purification rate is obtained within a range in which the probability of occurrence of an arc discharge is sufficiently reduced.

Further, when the air-fuel ratio has become leaner, the applied voltage is raised by a corresponding amount. Thus, as shown in FIG. 5, the discharge current is held at a fixed value that corresponds to the maximum current value (PM purification rate) within a range in which an arc discharge does not occur even if the air-fuel ratio changes. Thus, according to the applied voltage control, in the rich region, the applied voltage is lowered by an amount that corresponds to the amount by which the air-fuel ratio has become richer, and thus the occurrence of an arc discharge can be prevented. Further, the amount by which the applied voltage is lowered in accordance with the air-fuel ratio can be suppressed to a minimum, and the PM purification rate can be improved. In this connection, in the above described applied voltage control, an example is described in which the applied voltage is controlled based on the air-fuel ratio in a state in which parameters other than the air-fuel ratio are not taken into consideration (a state in which, for example, the number of engine revolutions, the intake air amount, the engine water temperature, the fuel injection timing and the like are constant). An optimal applied voltage to be applied in the rich region is significantly influenced by the air-fuel ratio even if other parameters fluctuate to a certain degree. Therefore, according to the applied voltage control, even when the applied voltage is set on the basis of only the air-fuel ratio, a sufficient operational advantage can be obtained. In this connection, a specific example of applied voltage control in which other parameters are also taken into consideration is described in Embodiment 2.

(Discharge Current Control)

Discharge current control is control that is executed in the lean region, and that subjects a discharge current I that flows between the electrodes 62 and 64 to feedback control to obtain a target current value. Since the amount of PM contained in the exhaust gas decreases in the lean region, the discharge current is less apt to flow by a degree that corresponds to the level of decrease in the amount of PM. As a result, even in a state in which the applied voltage is constant, the discharge current (applied energy) is liable to decrease. On the other hand, in the lean region, since an arc discharge is less apt to occur even if the applied voltage is raised, discharge current control can be easily performed. According to the discharge current control, the discharge current which is in a substantially proportional relationship with the PM purification rate can be controlled, and the PM purification rate can be accurately and easily maximized. Therefore, according to the present embodiment a configuration is adopted that performs discharge current control in the lean region.

Figure 6:
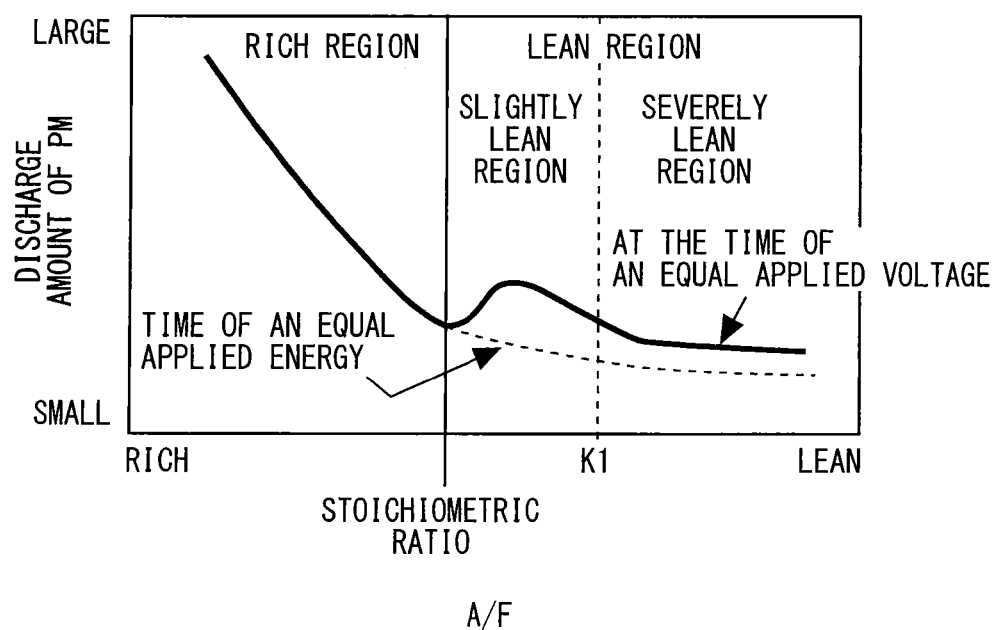
FIG. 6 is a characteristics diagram that shows the relation between the PM discharge amount after purification treatment by corona discharge and the exhaust air-fuel ratio.

Further, in the lean region, as shown in FIG. 3, two regions exist in which the sensitivities of the PM purification rate with respect to a change in the air-fuel ratio are different (hereunder, referred to as "slightly lean region" and "severely lean region"). According to the discharge current control, a configuration is adopted so that the control contents are switched between the slightly lean region and the severely lean region. More specifically, the sensitivity of the PM purification rate (gradients of the characteristic lines shown in FIG. 3) changes significantly at an air-fuel ratio boundary value K1 that is a predetermined air-fuel ratio within the lean region. That is, in the slightly lean region in which the air-fuel ratio is between the stoichiometric ratio and the air-fuel ratio boundary value K1, the PM purification rate rapidly decreases as the air-fuel ratio becomes leaner. In contrast, in the severely lean region in which the air-fuel ratio is leaner than the air-fuel ratio boundary value K1, the PM purification rate decreases relatively moderately as the air-fuel ratio becomes leaner. In this connection, when the stoichiometric ratio is taken as 14.5, the air-fuel ratio boundary value K1 is, for example, a value between approximately 15 and 16. As shown in FIG. 6, the above described sensitivity characteristic of the PM purification rate affects the PM purification capability in the lean region.

FIG. 6 is a characteristics diagram that shows the relation between the PM discharge amount after purification treatment by corona discharge and the exhaust air-fuel ratio. The solid line in FIG. 6 represents a PM discharge amount in a case where the applied voltage is fixed (time of an equal applied voltage), and the dashed line represents a PM discharge amount in a case where the applied energy is fixed (time of an equal applied energy). As shown in FIG. 6, the basic tendency of the discharge amount of PM (particle count) is to decrease as the air-fuel ratio becomes leaner. This tendency arises because the generated amount of PM mainly decreases on the lean side. However, in the slightly lean region close to the stoichiometric ratio, even though the generated amount of PM does not decrease by a significant amount, the PM purification rate rapidly decreases as described above. As a result, at the time of an equal applied voltage, a phenomenon occurs whereby, in the slightly lean region, the discharge amount of PM increases as the air-fuel ratio becomes leaner, and the purification capability decreases.

Therefore, in the discharge current control, as shown in FIG. 5, the leaner that the air-fuel ratio becomes in the slightly lean region, the more that the applied voltage is raised to increase the discharge current. According to this control, in the slightly lean region, the characteristic that the PM purification rate rapidly decreases can be compensated for by increasing the discharge current, and energy required for purification of PM can be reliably applied. Accordingly, even in the slightly lean region, it is possible to suppress the PM discharge amount after purification treatment, and realize a purification capability that is equal to the purification capability at the time of the equal applied energy shown in FIG. 6.

In contrast, in the severely lean region, the generated amount of PM decreases extremely as the air-fuel ratio becomes leaner. Therefore, as shown in FIG. 6, the discharge amount of PM in the severely lean region is a small amount even at the time of an equal applied voltage, and a sufficient purification capability is ensured. Therefore, according to the discharge current control, as shown in FIG. 5, the discharge current is decreased as the air-fuel ratio becomes leaner in the severely lean region. According to this control, in the severely lean region, the discharge amount of PM can be lowered using the minimum required energy, and thus the power consumption of the device can be suppressed and purification of PM can be efficiently performed.

In this connection, according to the present embodiment a configuration is adopted that switches the contents of discharge current control between the slightly lean region and the severely lean region. However, fundamentally there is a tendency for the PM discharge amount in the lean region to decrease as the air-fuel ratio becomes leaner. Therefore, even if the characteristic that the peak of a PM discharge amount occurs in the slightly lean region is ignored, a high purification capability can be exerted overall. Therefore, according to the present invention it is not necessarily the case that the contents of discharge current control must be switched between the slightly lean region and the severely lean region. More specifically, for the discharge current control, for example, a configuration may be adopted that decreases the discharge current as the air-fuel ratio becomes leaner in the entire lean region, as shown by a hypothetical line in FIG. 5. With this configuration also, the power consumption can be suppressed while adequately decreasing the discharge amount of PM.

Furthermore, the feedback control that is performed as discharge current control is, for example, control that increases or decreases the applied voltage based on an actual current value that is detected by the discharge current detection circuit 50B, to thereby cause the actual current value to match a target current value. In this case, although acquisition of the actual current value may be performed by the discharge current detection circuit 50B, a configuration may also be adopted that estimates the actual current value based on the operating state of the engine or the like. A specific method of estimating the discharge current is described in Embodiment 2.

Figure 7:
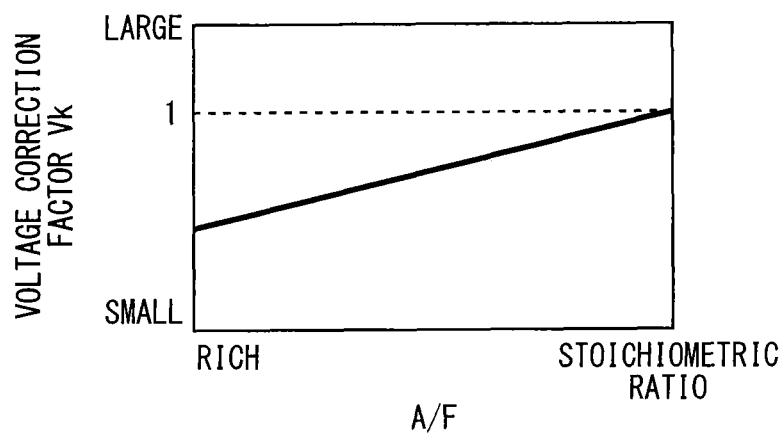
FIG. 7 shows map data for determining a voltage correction factor Vk based on the exhaust air-fuel ratio.
Figure 8:
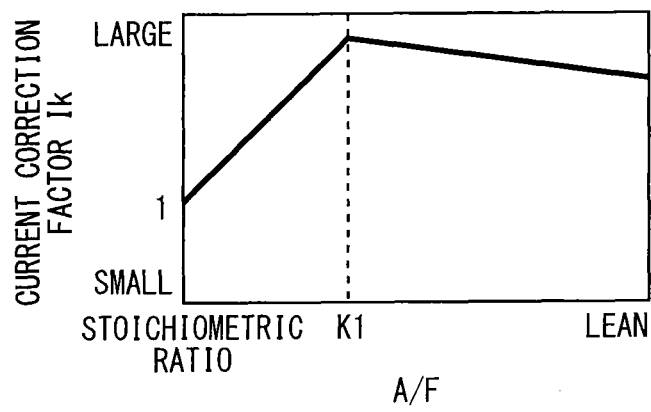
FIG. 8 is map data for determining a current correction factor Ik based on the exhaust air-fuel ratio.

In addition, data that is shown in FIG. 7 and FIG. 8 for implementing the above described applied voltage control and discharge current control is previously stored in the ECU 50. The data shown in FIG. 7 and FIG. 8 will now be described. First, FIG. 7 shows map data for determining a voltage correction factor Vk based on the exhaust air-fuel ratio. The voltage correction factor Vk realizes the applied voltage characteristic shown in the rich region in FIG. 4 when multiplied by an applied voltage (reference voltage) Vs at the stoichiometric ratio. Since an arc discharge is more liable to occur in the rich region in comparison to when the air-fuel ratio is the stoichiometric ratio, in the applied voltage control, the applied voltage is controlled in a voltage range that is lower than the reference voltage Vs. Therefore, the value of the voltage correction factor Vk at the stoichiometric ratio is "1", and the voltage correction factor Vk is set so as to decrease as the air-fuel ratio becomes richer. On the other hand, FIG. 8 is map data for determining a current correction factor Ik based on the exhaust air-fuel ratio. The current correction factor Ik realizes the discharge current characteristic shown in the lean region in FIG. 5 when multiplied by a discharge current (reference current) Is at the stoichiometric ratio. Processing that uses these correction factors Vk and Ik is described hereunder referring to FIG. 9.

Specific Processing to Realize Embodiment 1

Figure 9:
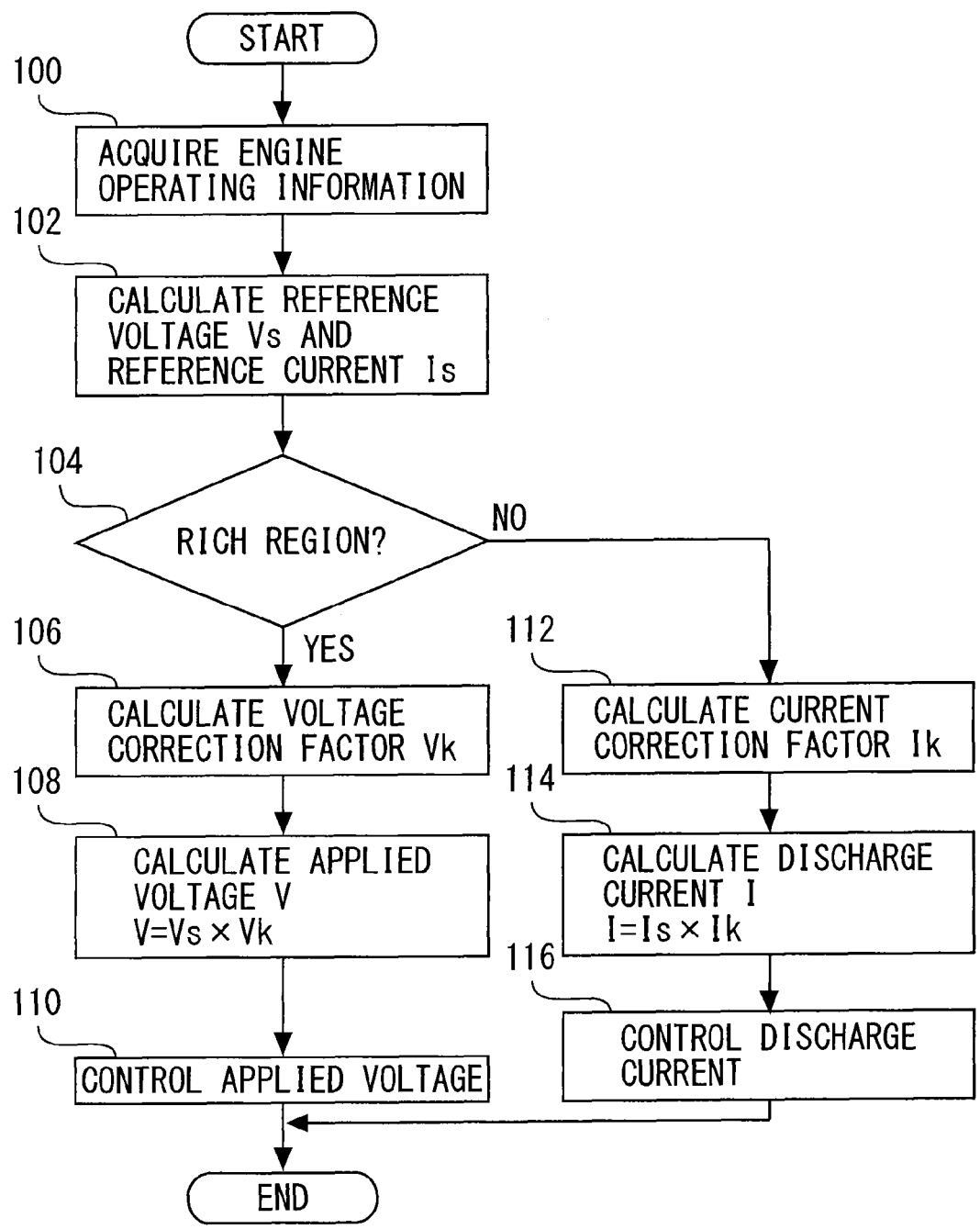
FIG. 9 is a flowchart that illustrates control executed by the ECU according to Embodiment 1 of the present invention.

Next, specific processing to realize the above described control is described referring to FIG. 9. FIG. 9 is a flowchart that illustrates control executed by the ECU according to Embodiment 1 of the present invention. The routine shown in FIG. 9 is repeatedly executed during operation of the engine. According to the routine shown in FIG. 9, first, in step 100, the ECU 50 acquires operating information of the engine based on the output of the sensor system. This operating information includes at least the number of engine revolutions, the load, the engine water temperature, the air-fuel ratio, the fuel injection timing, and the exhaust gas temperature.

Next, in step 102, the ECU 50 calculates the reference voltage Vs and the reference current Is at a time of the stoichiometric ratio based on the acquired operating information and the like. In this case, the term "reference voltage Vs" is defined as an applied voltage at which the PM purification rate is the maximum within a range in which an arc discharge does not occur in a stoichiometric ratio state. The reference voltage Vs changes in accordance with parameters such as, for example, the number of engine revolutions, the intake air amount, the air-fuel ratio, the engine water temperature, the exhaust gas temperature, the fuel injection amount, the fuel injection timing and the like. The relationships between these parameters and the reference voltage Vs can be determined by experiment and the like and represented as map data, and the map data is previously stored in the ECU 50.

Therefore, the ECU 50 can refer to the map data based on the operating information (the aforementioned parameters) acquired in step 102 and calculate the reference voltage Vs. Further, the term "reference current Is" is defined as a discharge current at which the PM purification rate is the maximum within a range in which an arc discharge does not occur in a stoichiometric ratio state. The ECU 50 can refer to map data based on the operating information and calculate the reference current Is by substantially the same method as in the case of the reference voltage Vs.

Subsequently, in step 104, the ECU 50 determines whether or not the air-fuel ratio is on the rich side of the stoichiometric ratio, that is, whether or not the air-fuel ratio is in the rich region. If the result determined in step 104 is affirmative, in step 106 the ECU 50 refers to the map data shown in FIG. 7 based on the air-fuel ratio and calculates the voltage correction factor Vk. Thereafter, in step 108, the ECU 50 calculates an applied voltage V (V=Vs×Vk) by multiplying the voltage correction factor Vk by the reference voltage Vs. Next, in step 110, the ECU 50 controls the applied voltage in a manner that takes the applied voltage V as the target voltage value.

In contrast, if the result determined in step 104 is not affirmative, in step 112 the ECU 50 refers to the map data shown in FIG. 8 based on the air-fuel ratio and calculates the current correction factor Ik. Thereafter, in step 114, the ECU 50 calculates a discharge current I (I=Is×Ik) by multiplying the current correction factor Ik by the reference current Is. Next, in step 116, the ECU 50 executes feedback control of the discharge current so that the actual current value matches the discharge current I that is the target current value.

As described above, according to the present embodiment, applied voltage control and discharge current control can be appropriately switched in accordance with the air-fuel ratio. Therefore, in both the rich region and the lean region, the state of a corona discharge can be appropriately controlled, and the PM purification rate can be stably improved while preventing an arc discharge.

Note that, in the above described Embodiment 1, steps 104 to 116 in FIG. 9 illustrate a specific example of the electricity supply control means according to claim 1. Among the aforementioned steps, steps 106 to 110 illustrate a specific example of the applied voltage control means according to claims 2 and 3, and steps 112 to 116 illustrate a specific example of the discharge current control means according to claims 4 and 6. Further, the characteristic line shown by the hypothetical line in FIG. 5 represents a specific example of the discharge current control means according to claim 5.

Further, in Embodiment 1 a configuration is adopted that switches control between the rich region and the lean region. However, a feature of the present invention is that the air-fuel ratio is used as a parameter for controlling the state of an electricity supply to the exhaust emission control device 24, and the present invention includes arbitrary applied voltage control and discharge current control that is performed based on the air-fuel ratio. Hence, the present invention is not limited to a configuration that switches control between the rich region and the lean region. As a specific example, according to the present invention, a configuration may also be adopted that, in a case where the PM purification rate or the probability of the occurrence of an arc discharge shows a characteristic tendency in an arbitrary air-fuel ratio region that is not divided into a rich region and a lean region, executes voltage control or current control that improves (or promotes) the tendency in the air-fuel ratio region. According to this configuration also, the state of an electricity supply (applied voltage and discharge current) to the exhaust emission control device 24 can be appropriately controlled in accordance with a tendency of the PM purification rate or the tendency regarding the probability of occurrence of an arc discharge or the like in respective air-fuel ratio regions. Accordingly, in a wide air-fuel ratio region that extends from a rich region to a lean region, the maximum PM purification rate can be stably realized while preventing an arc discharge.

Further, according to Embodiment 1 a configuration is adopted that executes one of applied voltage control and discharge current control in accordance with the air-fuel ratio. However, the present invention is not limited thereto and, for example, a configuration may be adopted that executes applied voltage control based on the air-fuel ratio in both regions, that is, the rich region and the lean region. Further, discharge current control based on the air-fuel ratio may also be executed in both regions. In addition, a configuration may be adopted that executes applied voltage control or discharge current control based on the air-fuel ratio in only one of the rich region and the lean region, and performs control of the applied voltage or the discharge current in the other region irrespective of the air-fuel ratio.

In Embodiment 1 a configuration is adopted that executes discharge current control in a case where, in FIG. 9, the air-fuel ratio is exactly the stoichiometric ratio. However, the present invention is not limited thereto, and a configuration may also be adopted that executes one of applied voltage control and discharge current control in a case where the air-fuel ratio is the stoichiometric ratio.

Embodiment 2

Next, Embodiment 2 of the present invention is described referring to FIG. 10 to FIG. 21. A feature according to the present embodiment is that, with substantially the same configuration and control (FIG. 1, FIG. 9 and the like) as in the above described Embodiment 1, applied voltage control is executed in a manner that also takes into consideration parameters other than the air-fuel ratio. According to the present embodiment, components that are the same as in Embodiment 1 are denoted by the same reference symbols, and a description of such components is omitted.

Feature of Embodiment 2

As described above, although applied voltage control can be executed based on the air-fuel ratio, the accuracy of the control can be improved by also taking other parameters into consideration. In this case, an engine temperature (engine water temperature), a fuel injection timing, an in-cylinder injection amount and the like can be mentioned as examples of parameters other than the air-fuel ratio. Note that the engine temperature is not limited to the engine water temperature, and the temperature of lubricating oil or the like may also be used. When the respective parameters described above change, the PM amount contained in the exhaust gas (generated amount of PM) changes, and as a result the optimal applied voltage for making the PM purification rate the maximum rate also changes. Therefore, according to the present embodiment, first the PM amount in exhaust gas is calculated based on the exhaust air-fuel ratio, the engine water temperature, the fuel injection timing, the in-cylinder injection amount and the like, and thereafter the applied voltage is calculated based on the PM amount and the like.

(PM Amount Calculation Processing)

Figure 10:
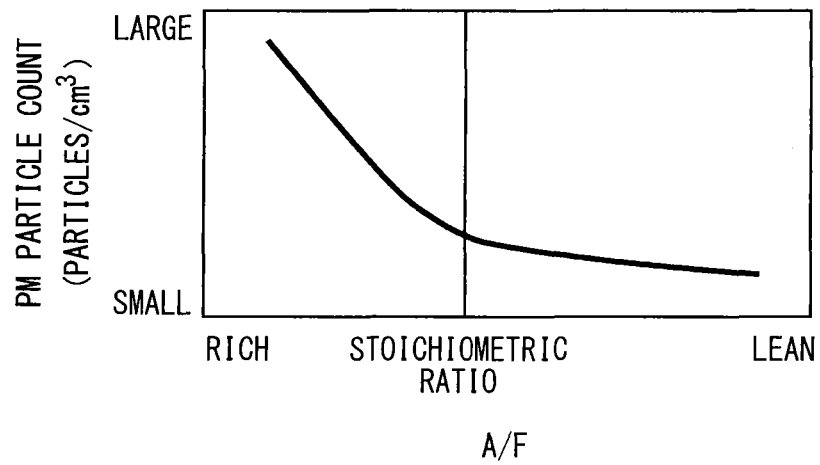
FIG. 10 is a characteristics diagram that illustrates the relationship between the exhaust air-fuel ratio and the PM particle count contained in exhaust gas according to Embodiment 2 of the present invention.

First, the relationship between each of the aforementioned parameters and the PM amount is described referring to FIG. 10 to FIG. 13. FIG. 10 is a characteristics diagram that illustrates the relationship between the exhaust air-fuel ratio and the PM particle count contained in exhaust gas according to Embodiment 2 of the present invention. As the air-fuel ratio becomes leaner, the amount of fuel contributing to combustion decreases by a corresponding amount, and hence the generated amount of PM also decreases. Therefore, as shown in FIG. 10, there is a characteristic that the PM particle count decreases as the air-fuel ratio becomes leaner. In this connection, the PM particle count corresponds to the concentration (density) of PM contained in exhaust gas in a state in which the exhaust gas flow rate is constant.

Figure 11:
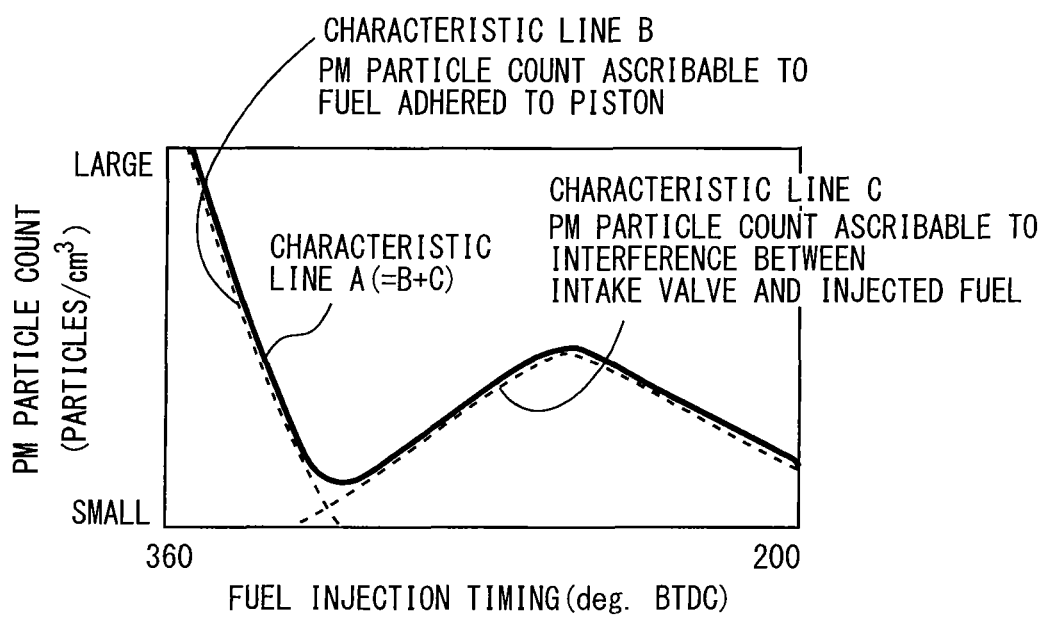
FIG. 11 is a characteristics diagram that shows the relationship between the fuel injection timing (injection start timing) and the PM particle count in exhaust gas.

FIG. 11 is a characteristics diagram that shows the relationship between the fuel injection timing (injection start timing) and the PM particle count in exhaust gas. In a combustion stroke, of the total amount of injected fuel, as the amount of fuel that adheres to a piston or that is interfered with by the intake valve increases, the more liable the generated amount of PM is to increase. Further, an adherence amount (interference amount) of fuel with respect to a piston or an intake valve is influenced by the position of the piston at the time that the fuel is injected or the lift amount of the intake valve. Therefore, a correlation exists between the PM particle count and the fuel injection timing. The characteristics diagram shown in FIG. 11 can be obtained when this correlation is determined by experimentation and the like. In this connection, a characteristic line A represented by a solid line in FIG. 11 is obtained by combining a characteristic line B of a PM particle count that is ascribable to fuel adhered to the piston and a characteristic line C of a PM particle count that is ascribable to interference between the intake valve and the injected fuel.

Figure 12:
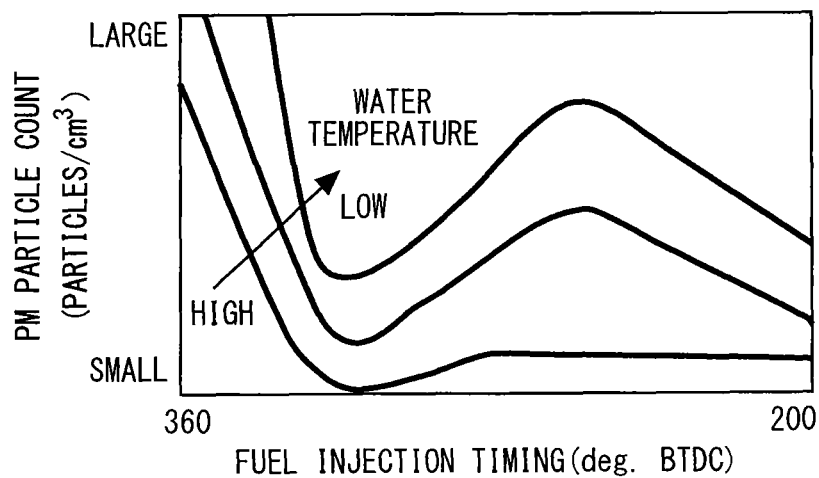
FIG. 12 is a characteristics diagram that shows the relationship between the characteristic line shown in FIG. 11 and the engine water temperature.

FIG. 12 is a characteristics diagram that shows the relationship between the characteristic line shown in FIG. 11 and the engine water temperature. In general, since combustibility deteriorates at the time of a low temperature, the PM particle count in exhaust gas increases as the engine temperature decreases. Therefore, as shown in FIG. 12, the above described characteristic line A changes in a direction in which the PM particle count increases as the engine water temperature decreases. In this connection, with respect to the characteristic lines shown in FIG. 12, when a portion attributable to fuel adhering to the piston (portion corresponding to the above described characteristic line B) and a portion attributable to interference between the intake valve and injected fuel (portion corresponding to the above described characteristic line C) are compared, it is found that the sensitivity to changes in the engine water temperature is greater in the portion attributable to interference between the intake valve and injected fuel. This sensitivity to temperature changes is also reflected in the characteristic lines shown in FIG. 12.

Figure 13:
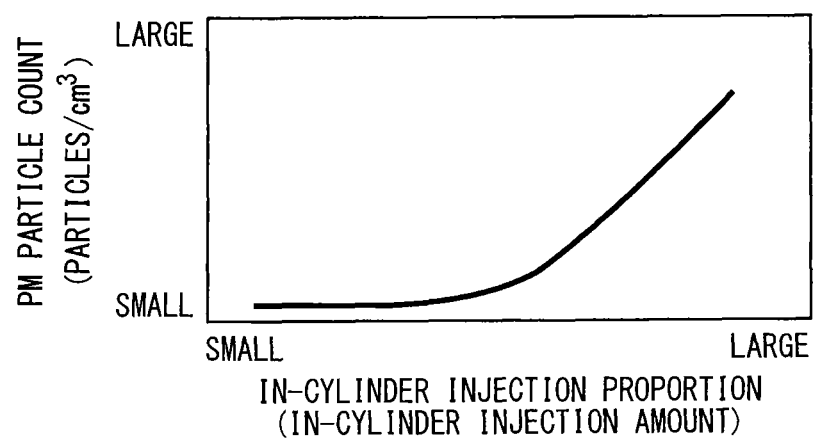
FIG. 13 is a characteristics diagram that shows the relationship between an in-cylinder injection amount and the PM particle count.

FIG. 13 is a characteristics diagram that shows the relationship between an in-cylinder injection amount and the PM particle count. In general, in the case of a dual injection-type engine that is equipped with an in-cylinder fuel injection valve and an intake-port fuel injection valve, even if the overall fuel injection amount is constant, the amount of fuel that adheres to the inside of the cylinder or the intake valve increases when the proportion of the in-cylinder injection amount is increased. Therefore, as shown in FIG. 13, there is a tendency for the PM particle count to increase as the in-cylinder injection amount (or the in-cylinder injection proportion with respect to the overall fuel injection amount) increases.

A plurality of kinds of map data that are created based on the data shown in the above described FIG. 10 to FIG. 13 are previously stored in the ECU 50. The plurality of kinds of map data include basic map data for calculating an estimated piston adherence amount FMp and an estimated IN valve interference amount FMiv, respectively, based on the fuel injection timing, water temperature map data for calculating water temperature correction factors ka1 and kb1, respectively, based on the engine water temperature, air-fuel ratio map data for calculating A/F correction factors ka2 and kb2, respectively, based on the air-fuel ratio, and injection proportion map data for calculating injection proportion correction factors ka3 and kb3 based on an in-cylinder injection proportion.

Here, the estimated piston adherence amount FMp corresponds to a generated amount of PM that is ascribable to fuel that adhered to the piston, and the estimated IN valve interference amount FMiv corresponds to a generated amount of PM that is ascribable to interference between the intake valve and injected fuel. The correction factors ka1, ka2, and ka3 are correction factors for correcting the estimated piston adherence amount FMp based on the water temperature, the air-fuel ratio, and the injection proportion, respectively. The correction factors kb1, kb2, and kb3 are correction factors for correcting the estimated IN valve interference amount FMiv based on the water temperature, the air-fuel ratio, and the injection proportion, respectively. The correction factors ka1 to ka3 and kb1 to kb3 are set within a range of 0 to 1, respectively. Further, the injection proportion correction factors ka3 and kb3 are applied to a dual injection-type engine, and are maintained at a value of 1 according to the present embodiment.

Next, processing that calculates a PM amount based on each of the above described kinds of map data is described. In the processing to calculate a PM amount, first, the engine water temperature, the fuel injection timing, and the in-cylinder injection proportion are acquired based on the output of the sensor system. Subsequently, by referring to each of the above described kinds of map data based on the aforementioned parameters, the estimated piston adherence amount FMp, the estimated IN valve interference amount FMiv, and the correction factors ka1 to ka3 and kb1 to kb3 are calculated, respectively. In addition, a PM concentration D (particles/cm$^3$) is calculated based on the following equations (1) to (3).

$$a_n = (ka1 \times ka2 \times ka3) \times a_{n-1} \quad (1)$$

$$b_n = (kb1 \times kb2 \times kb3) \times b_{n-1} \quad (2)$$

$$D = a_n \times FMp + b_n \times FMiv \quad (3)$$

Here, $a_n$ and $b_n$ are total correction factors in which the respective correction factors ka1 to ka3 and kb1 to kb3 are reflected. The total correction factors $a_n$ and $b_n$ show values that are calculated in the most recent calculation cycle, and at the time of that calculation, total correction factors $a_{n-1}$ and $b_{n-1}$ that were calculated in the previous calculation cycle are used. In the following processing, an exhaust gas flow rate E (cm$^3$/sec) is calculated based on the number of engine revolutions, the intake air amount, the fuel injection amount and the like, and a PM amount F is calculated by the following equation (4) based on the exhaust gas flow rate E and the aforementioned PM concentration D. Thus, the PM amount F is calculated as a flow rate of particles (particles/sec). In this connection, it is good to set the initial value of the total correction factors $a_n$ and $b_n$ to 1.

$$F = D \times E \quad (4)$$

Further, the PM particle count in the exhaust gas rises as the load of the engine increases. Therefore, according to the present invention, a configuration may also be adopted in which the relationship between the PM particle count and the load is expressed as map data, and the PM amount is corrected based on the load.

(Applied Voltage Calculation Processing)

Next, processing that calculates the applied voltage based on the PM amount is described. An object of this calculation processing is to apply a necessary maximum voltage within a range in which an arc discharge does not occur. Therefore, in the applied voltage calculation processing, first, the ECU 50 calculates a theoretical energy (required applied energy) Eb that is necessary to oxidize the total amount of PM based on the PM amount contained in the exhaust gas, and calculates an applied voltage (base applied voltage) Vb that is necessary in order to apply the aforementioned required applied energy into the exhaust gas.

Figure 14:
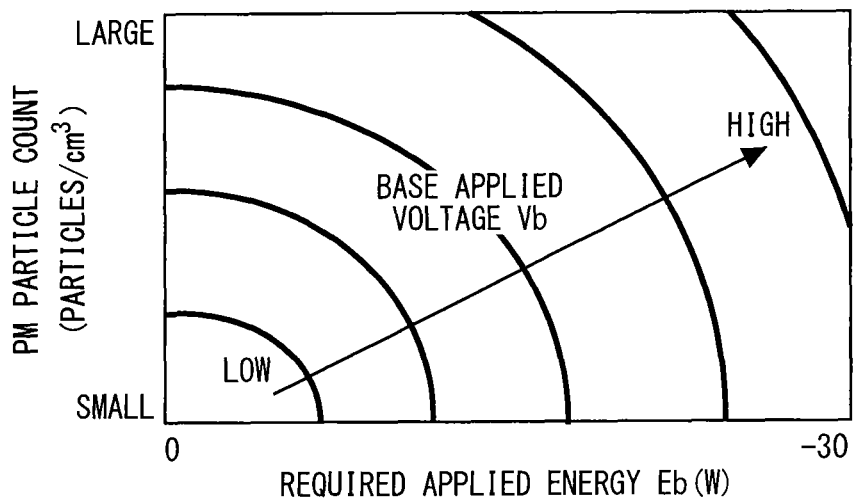
FIG. 14 shows map data for determining the base applied voltage Vb based on the required applied energy Eb and the PM amount.

The required applied energy Eb, for example, is obtained by performing addition with respect to oxidation energy (activation energy) per unit particle of PM, which is already known, that corresponds to the PM amount contained in the exhaust gas. Map data obtained by converting this addition processing into data format, that is, map data (energy map data) for calculating the required applied energy Eb based on the PM amount, is previously stored in the ECU 50. Further, as shown in FIG. 14, it is necessary to raise the base applied voltage Vb as the required applied energy Eb increases or as the PM amount increases. FIG. 14 shows map data for determining the base applied voltage Vb based on the required applied energy Eb and the PM amount. This map data is previously stored in the ECU 50. When referring to the map data shown in FIG. 14, it is preferable that the ECU 50 uses the PM particle count, that is, the aforementioned PM concentration D (particles/cm$^3$) as the PM amount. The ECU 50 can calculate the base applied voltage Vb based on the PM amount by means of the above described two kinds of map data, and apply the base applied voltage Vb between the electrodes 62 and 64.

According to the above described processing for calculating the applied voltage, the state of parameters including the required applied energy Eb that is necessary to oxidize the PM contained in the exhaust gas, the air-fuel ratio, the engine water temperature, the fuel injection timing and the in-cylinder injection proportion are reflected in the base applied voltage Vb, and the base applied voltage Vb can be appropriately controlled in accordance with the respective parameters. Specifically, the fundamental tendency is that the base applied voltage Vb can be lowered as the PM amount contained in the exhaust gas increases. More specifically, the richer the air-fuel ratio is, the lower the engine water temperature is, and the higher the in-cylinder injection proportion is, the greater the degree to which the base applied voltage Vb can be lowered. Furthermore, the base applied voltage Vb can also be lowered in a case where the fuel injection timing is such that the PM amount is liable to increase.

Even when the applied voltage is appropriately controlled in the above described manner, the actual discharge current that flows between the electrodes 62 and 64 is liable to fluctuate due to factors other than the applied voltage as well as various kinds of losses and the like. If the discharge current fluctuates to a side on which the current decreases more than expected, the actual applied energy will be lower than the required applied energy Eb, and the PM purification rate will fall. Further, if the discharge current fluctuates to a side on which the current increases more than expected, there is a risk of an arc discharge occurring. Therefore, according to the present embodiment, by executing voltage optimization processing and arc discharge prevention processing that are described below, a final applied voltage V is calculated that takes the base applied voltage Vb as an initial value, and this applied voltage V is applied between the electrodes 62 and 64.

(Voltage Optimization Processing)

According to this processing, before applying the actual voltage, first, a discharge current is estimated by a method described later based on a voltage that it is intended to apply (hereunder, referred to as "assumed voltage") and the like. Next, the applied energy is estimated based on the estimated discharge current and the assumed voltage, and the assumed voltage is corrected so that the estimated value of the applied energy becomes equal to the required applied energy Eb. Further, the assumed voltage when the estimated value of the applied energy is equal to the required applied energy Eb, that is, the assumed voltage when the estimated discharge current is a value that satisfies the requirement with respect to the required applied energy Eb, is calculated as the appropriate applied voltage. In this processing, the base applied voltage Vb is used as the initial value (value before correction) of the assumed voltage.

According to the above described voltage optimization processing, before applying the actual voltage, it is possible to estimate the discharge current based on the voltage it is intended to apply, and adjust the applied voltage based on the estimated discharge current Ie. That is, the applied voltage can be optimized so that the applied energy is equal to the required applied energy Eb. Accordingly, a situation in which the applied energy is insufficient or energy of an amount that is more than necessary is applied at the time of a corona discharge can be prevented, and PM can be efficiently purified while suppressing the power consumption.

(Arc Discharge Prevention Processing)

This processing limits an applied voltage obtained by the voltage optimization processing to within in a voltage range in which an arc discharge does not occur. At the time of a corona discharge, a circular discharge region is formed from the center electrode 62 towards the earth electrode 64, and if a discharge radius (range of the discharge) Rb thereof is within the radius (inter-electrode distance between the electrodes 62 and 64) of the earth electrode 64, the corona discharge can be stably sustained. In contrast, if the discharge radius Rb exceeds the radius of the earth electrode 64 (hereunder, referred to as "pipe diameter R"), there is a tendency for the probability of occurrence of an arc discharge to increase rapidly. Therefore, according to the arc discharge prevention processing, first, based on the assumed voltage it is intended to apply and the PM amount, the discharge radius Rb in a case where the relevant assumed voltage is applied is calculated.

Figure 15:
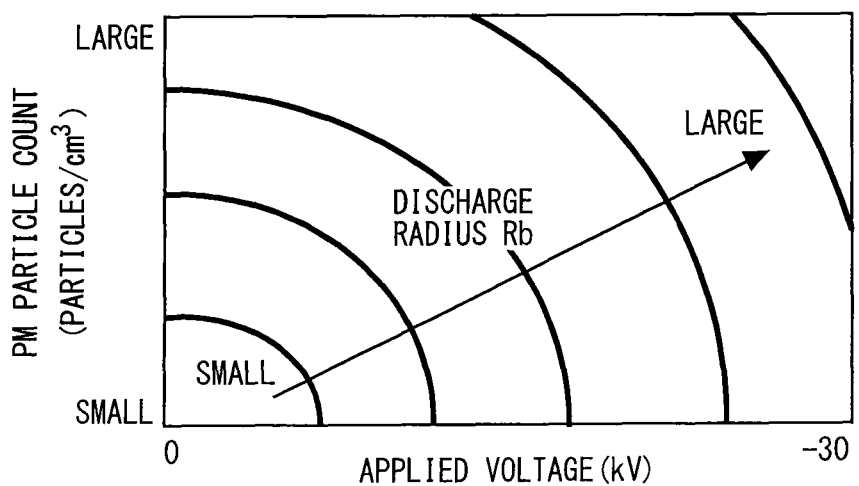
FIG. 15 shows map data for calculating the discharge radius Rb based on the applied voltage and the PM amount (PM particle count).

FIG. 15 shows map data for calculating the discharge radius Rb based on the applied voltage and the PM amount (PM particle count). This map data is previously stored in the ECU 50. As shown in FIG. 15, there is a tendency for the discharge radius Rb to increase as the applied voltage increases or as the PM particle count in the exhaust gas increases. In the arc discharge prevention processing, a specific assumed voltage at which the discharge radius Rb that is calculated based on the map data shown in FIG. 15 becomes equal to the pipe diameter R is calculated as the upper limit of the applied voltage, and the actual applied voltage is limited by this upper limit. More specifically, the smaller value among the applied voltage calculated by the voltage optimization processing and the aforementioned upper limit is calculated as the final applied voltage V. In this connection, the pipe diameter R is previously stored in the ECU 50 as known data.

According to the above described arc discharge prevention processing, before applying the actual voltage, the voltage that it is intended to apply can be limited to a maximum voltage value within a range in which an arc discharge does not occur. Therefore, inefficient control that decreases the applied voltage after an arc discharge has occurred is unnecessary, and the maximum PM purification rate can be obtained while preventing an arc discharge from occurring.

(Discharge Current Estimation Processing)

Figure 16:
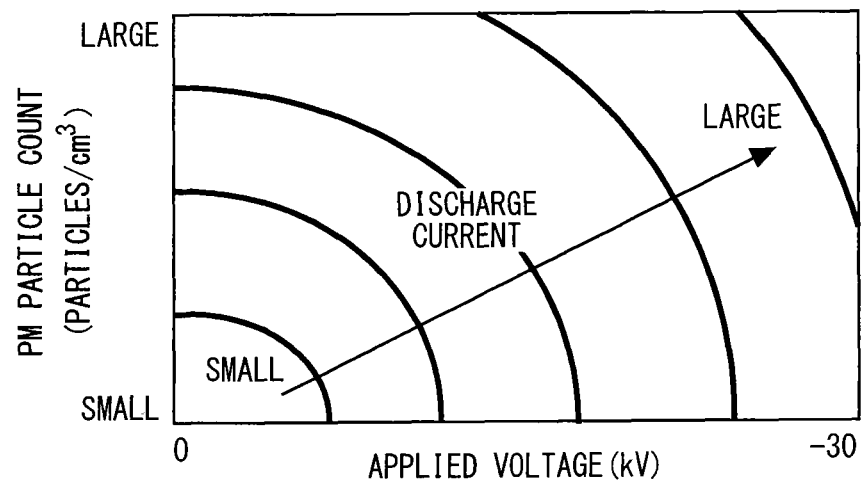
FIG. 16 shows map data for calculating the base discharge current based on the applied voltage and the PM amount.

Next, processing to estimate a discharge current to be used in the voltage optimization processing is described. This estimation processing estimates the size of a discharge current based on the applied voltage (assumed voltage), the PM amount, the exhaust gas temperature, and the air-fuel ratio, without actually applying a voltage. More specifically, first, based on the map data shown in FIG. 16, the ECU 50 calculates a base discharge current Ib to serve as an initial value of the estimation processing. FIG. 16 shows map data for calculating the base discharge current based on the applied voltage and the PM amount. This map data is previously stored in the ECU 50. As shown in FIG. 16, there is a tendency for the discharge current to increase as the applied voltage increases or as the PM amount in the exhaust gas increases. In the above described voltage optimization processing, by referring to the map data of FIG. 16 based on the assumed voltage and the PM amount, a discharge current that flows in a case where the relevant assumed voltage is applied can be estimated.

Figure 17:
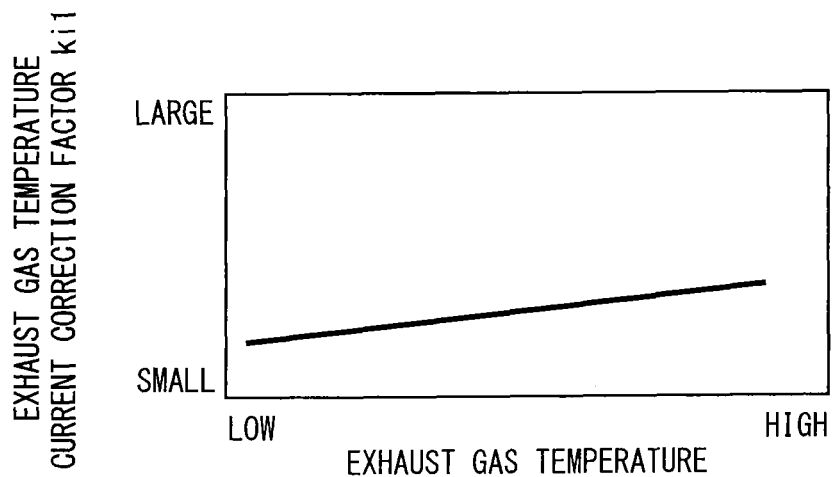
FIG. 17 shows map data for calculating an exhaust gas temperature current correction factor ki1 based on the exhaust gas temperature.
Figure 18:
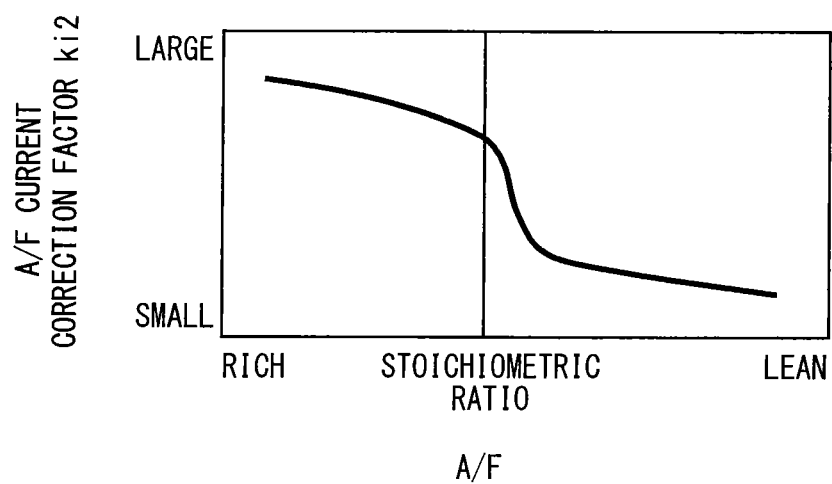
FIG. 18 shows map data for calculating an A/F current correction factor ki2 based on the exhaust air-fuel ratio.

In the next processing, the ECU 50 corrects the base discharge current Ib based on the exhaust gas temperature and the air-fuel ratio, and calculates the estimated discharge current Ie as the final estimated value. For this purpose, the map data shown in FIG. 17 and FIG. 18 is previously stored in the ECU 50. FIG. 17 shows map data for calculating an exhaust gas temperature current correction factor ki1 based on the exhaust gas temperature. FIG. 18 shows map data for calculating an A/F current correction factor ki2 based on the exhaust air-fuel ratio. The correction factors ki1 and ki2 are each set within a range of 0 to 1.

As shown in FIG. 17, even if other conditions are the same, there is a tendency for the discharge current to increase as the exhaust gas temperature rises. Further, as shown in FIG. 18, there is a tendency for the discharge current to decrease as the air-fuel ratio becomes leaner. The ECU 50 calculates the estimated discharge current Ie by the following equation (5) based on the correction factors ki1 and ki2 calculated by means of the aforementioned map data and the base discharge current Ib.

$$Ie = ki1 \times ki2 \times Ib \tag{5}$$

According to the discharge current estimation processing described above, even without applying the actual voltage, the estimated discharge current Ie can be calculated in which the states of the PM amount in the exhaust gas, the exhaust gas temperature, the air-fuel ratio, and the applied voltage are reflected. More specifically, according to the present embodiment, although it is also possible to detect the actual discharge current by means of the discharge current detection circuit 50B of the ECU 50, in such case it is necessary to temporarily apply a voltage between the electrodes 62 and 64 and it is considered that an arc discharge may occur due to the application of such a voltage. In contrast, by using the aforementioned estimation processing, an arc discharge is not erroneously generated, and an optimal value of the applied voltage with respect to which the behavior of the discharge current has been taken into consideration can be easily acquired.

Specific Processing to Realize Embodiment 2

Figure 19:
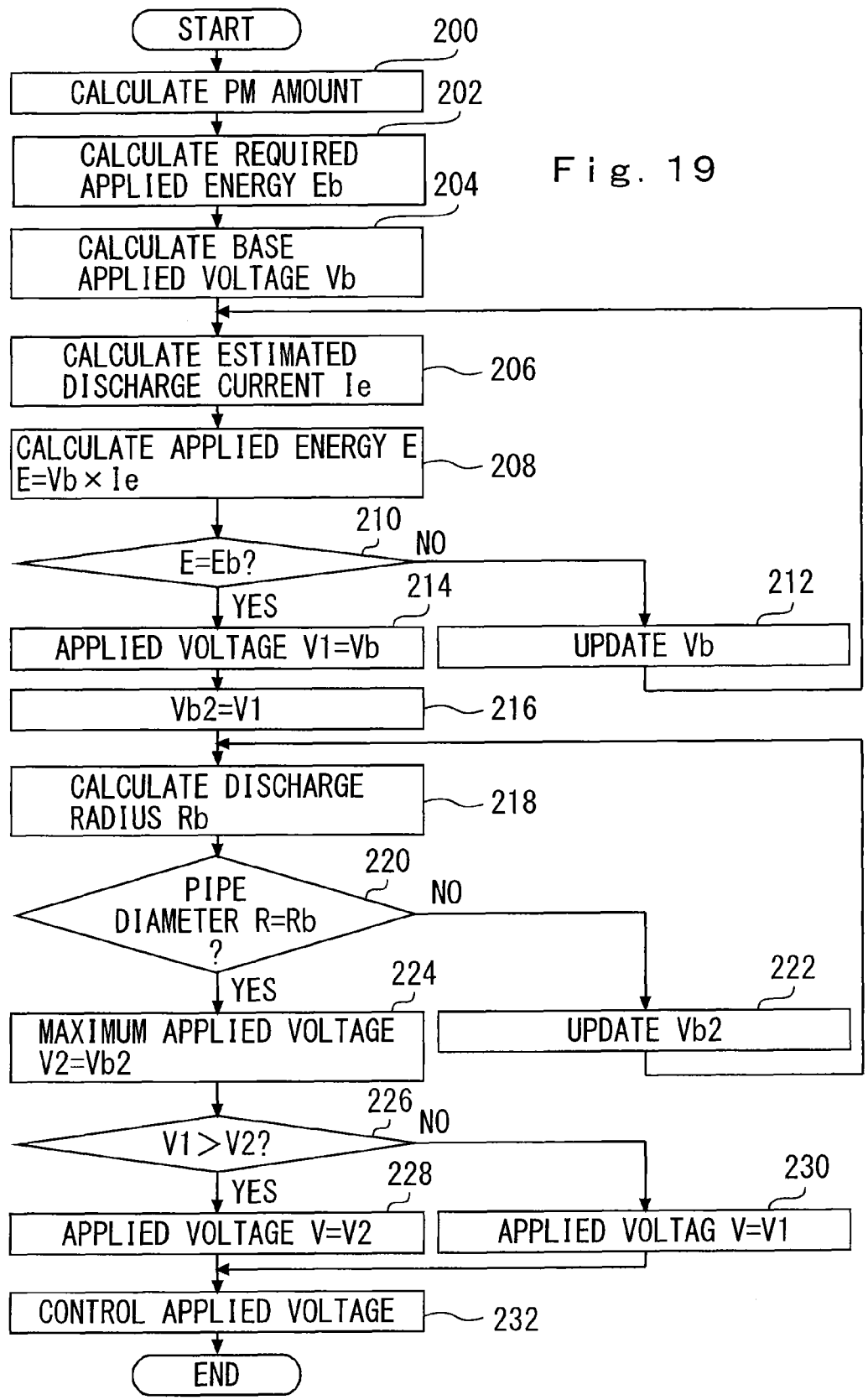
FIG. 19 is a flowchart of the applied voltage control executed by the ECU in Embodiment 2 of the present invention.
Figure 20:
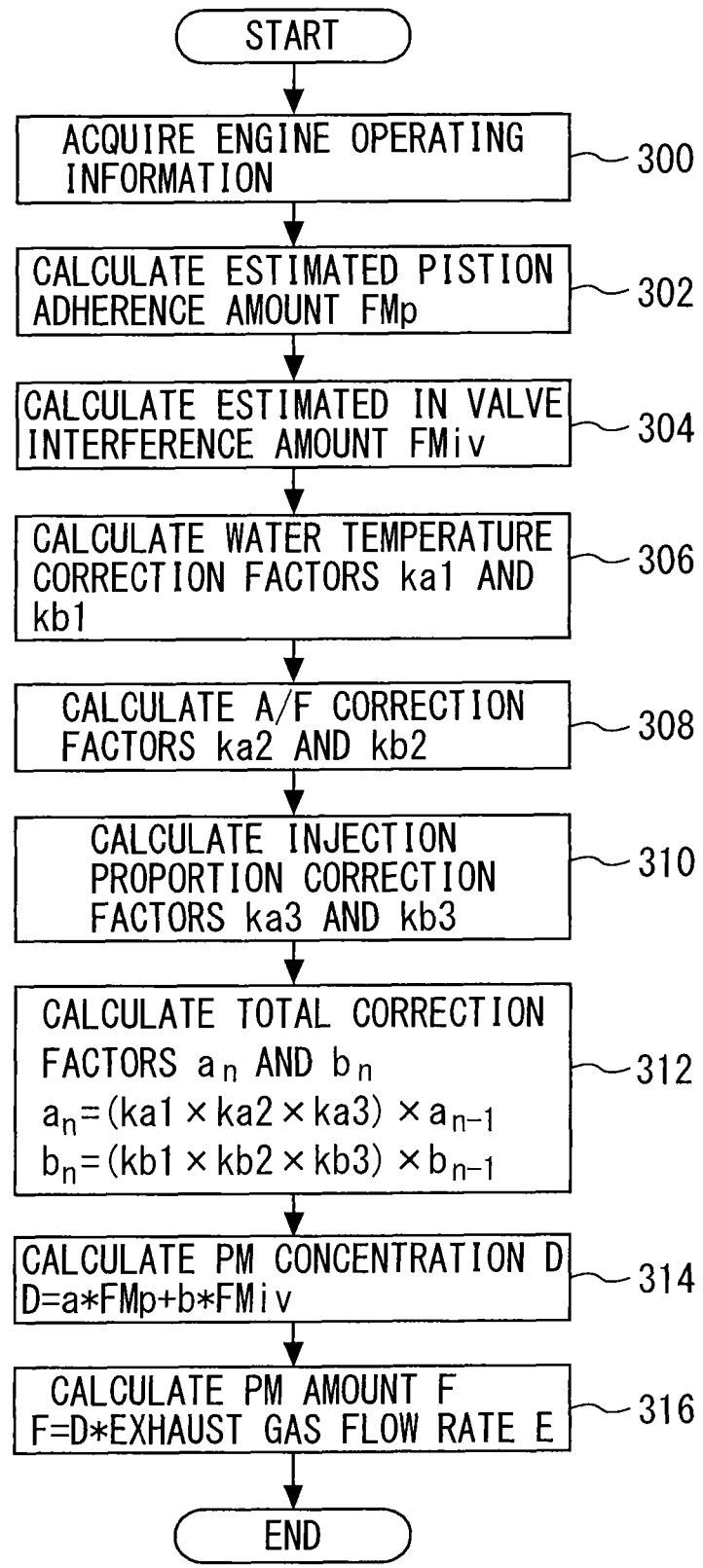
FIG. 20 is a flowchart showing PM amount calculation processing executed by the ECU.
Figure 21:
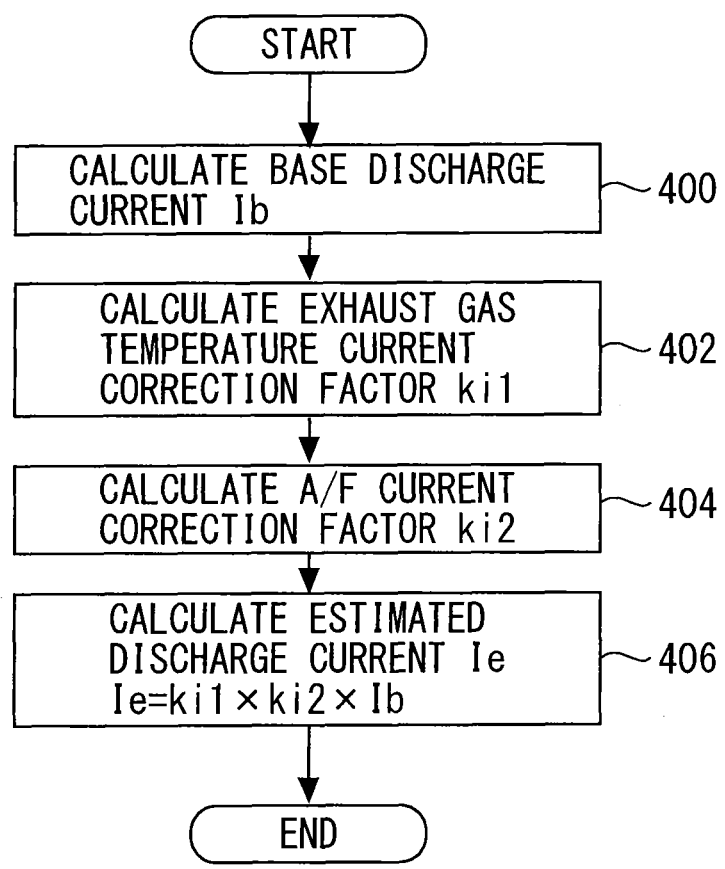
FIG. 21 is a flowchart that shows discharge current estimation processing executed by the ECU.

Next, specific processing to realize the above described control is described referring to FIG. 19 to FIG. 21. First, FIG. 19 is a flowchart of the applied voltage control executed by the ECU in Embodiment 2 of the present invention. The routine shown in FIG. 19 is executed instead of steps 106 to 110 of Embodiment 1 (FIG. 9). According to the routine shown in FIG. 19, first, in step 200, the ECU 50 calculates the PM amount contained in the exhaust gas by executing the processing shown in FIG. 20 that is described later. Next, in steps 202 and 204, the ECU 50 executes the above described applied voltage calculation processing. More specifically, in step 202, the ECU 50 calculates the required applied energy Eb by referring to the aforementioned energy map data based on the PM amount. Further, in step 204, the ECU 50 refers to the map data of FIG. 14 based on the required applied energy Eb and the PM amount, and calculates the base applied voltage Vb.

Next, in steps 206 to 214, the ECU 50 executes the above described voltage optimization processing. First, in step 206, by executing the processing shown in FIG. 21 that is described later, the ECU 50 calculates the estimated discharge current Ie based on the applied voltage (assumed voltage) and the PM amount. Although the processing of steps 206 to 212 is repeatedly executed as loop processing, when executing step 206 for the first time, the base applied voltage Vb calculated in step 204 is used as the initial value of the assumed voltage. Next, in step 208, the ECU 50 calculates the applied energy E (=Vb×Ie) based on the estimated discharge current Ie calculated in step 206 and the base applied voltage Vb. Subsequently, in step 210, the ECU 50 determines whether or not the value calculated for the applied energy E is equal to the required applied energy Eb.

If the result determined in step 210 is not affirmative, in step 212 the ECU 50 updates (changes) the value of the base applied voltage Vb by a predetermined update amount, and the processing returns to step 206. Thereafter, in step 206, the estimated discharge current Ie is calculated again using the updated base applied voltage Vb as the assumed voltage. In this connection, the update amount of the base applied voltage Vb is set so that the applied energy E approaches the required applied energy Eb based on, for example, the size of a difference (E−Eb) between the applied energy E and the required applied energy Eb as well as whether the value is positive or negative. Thus, in steps 206 to 212, loop processing is performed while updating the base applied voltage Vb until the applied energy E becomes equal to the required applied energy Eb. At the time point that the applied energy E and the required applied energy Eb become equal, the result determined in step 210 is affirmative and therefore the loop processing ends. Thereafter, in step 214, the final updated value of the base applied voltage Vb in the aforementioned loop processing is calculated as a provisional applied voltage V1.

Next, in steps 216 to 230, the aforementioned arc discharge prevention processing is executed. First, in step 216, the provisional applied voltage V1 is substituted with an assumed voltage Vb2 that is a variable used for updating. Thereafter, in step 218, the ECU 50 refers to the map data of FIG. 15 based on the assumed voltage Vb2 and the PM amount to calculate the discharge radius Rb. Next, in step 220, the ECU 50 determines whether or not the discharge radius Rb is equal to the pipe diameter R. If the result determined in step 220 is not affirmative, in step 222 the assumed voltage Vb2 is updated (changed) by a predetermined update amount, and the processing returns to step 218. Subsequently, in step 218, the ECU 50 calculates the discharge radius Rb again based on the updated assumed voltage Vb2 and the PM amount. Thus, in steps 218 to 222, loop processing is performed while updating the assumed voltage Vb2 until the discharge radius Rb becomes equal to the pipe diameter R. At the time point that the discharge radius Rb and the pipe diameter R become equal, the result determined in step 220 is affirmative and therefore the loop processing ends. Thereafter, in step 224, the final updated value of the assumed voltage Vb2 in the aforementioned loop processing is calculated as the maximum applied voltage V2 with which an arc discharge can be avoided.

Subsequently, in step 226, the ECU 50 determines whether or not the aforementioned applied voltage V1 is greater than the maximum applied voltage V2. If the result determined in step 226 is affirmative, since there is a high probability of an arc discharge occurring if the applied voltage V1 is applied as it is, in step 228 the ECU 50 calculates the maximum applied voltage V2 as the final applied voltage V. In contrast, if the result determined in step 226 is not affirmative, since the occurrence of an arc discharge can be avoided when applying the applied voltage V1, in step 230, the ECU 50 calculates the applied voltage V1 as the final applied voltage V. Since the final applied voltage V is calculated by the above described processing, in step 232 the ECU 50 controls a voltage that is applied between the electrodes 62 and 64 by taking the applied voltage V as the target voltage value.

Next, processing to calculate the PM amount is described referring to FIG. 20. FIG. 20 is a flowchart showing PM amount calculation processing executed by the ECU. The routine shown in FIG. 20 is repeatedly executed during operation of the engine. According to the routine shown in FIG. 20, first, in step 300, the ECU 50 acquires operating information of the engine based on the output of the sensor system. This operating information includes at least the number of engine revolutions, the intake air amount, the load, the engine water temperature, the air-fuel ratio, the exhaust gas temperature, the fuel injection timing, and the in-cylinder injection proportion (in the case of a dual injection-type engine).

Next, in step 302, the ECU 50 refers to the basic map data based on the fuel injection timing and calculates the estimated piston adherence amount FMp. Further, in step 304, the ECU 50 refers to the basic map data based on the fuel injection timing and calculates the estimated IN valve interference amount FMiv. Thereafter, in step 306, the ECU 50 refers to the water temperature map data based on the engine water temperature to thereby calculate the water temperature correction factors ka1 and kb1, and in step 308, the ECU 50 refers to the air-fuel ratio map data based on the air-fuel ratio to thereby calculate the A/F correction factors ka2 and kb2. Subsequently, in step 310, the ECU 50 refers to the injection proportion map data based on the in-cylinder injection proportion to thereby calculate the injection proportion correction factors ka3 and kb3. Next, in step 312, the ECU 50 calculates the total correction factors $a_n$ and $b_n$ by means of the above described equations (1) and (2). Thereafter, in step 314, the ECU 50 calculates the PM concentration (PM particle count) D by means of the above described equation (3). Subsequently, in step 316, the ECU 50 calculates the exhaust gas flow rate E based on the number of engine revolutions, the intake air amount, the fuel injection amount and the like, and calculates the PM amount F by means of the above described equation (4).

Next, processing to estimate the discharge current is described referring to FIG. 21. FIG. 21 is a flowchart that shows discharge current estimation processing executed by the ECU. The routine shown in FIG. 21 is repeatedly executed during operation of the engine. According to the routine shown in FIG. 21, first, in step 400, the ECU 50 refers to the map data shown in FIG. 16 based on the applied voltage (assumed voltage) and the PM amount to calculate the base discharge current Ib. Next, in step 402, the ECU 50 refers to the map data shown in FIG. 17 based on the exhaust gas temperature to calculate the exhaust gas temperature current correction factor ki1. Further, in step 404, the ECU 50 refers to the map data shown in FIG. 18 based on the air-fuel ratio to calculate the A/F current correction factor kit. Next, in step 406, the ECU 50 calculates the estimated discharge current Ie by means of the above described equation (5).

Note that in the above described Embodiment 2, steps 200 to 232 in FIG. 19 show a specific example of the applied voltage control means according to claims 2, 3, 7 and 8. Further, steps 300 to 316 in FIG. 20 show a specific example of the PM amount calculation means according to claims 7 and 10, and steps 400 to 406 in FIG. 21 show a specific example of the discharge current estimation means according to claim 8. Furthermore, steps 216 to 230 in FIG. 19 show a specific example of the arc discharge prevention means according to claims 9 and 10, and step 218 shows a specific example of the discharge distance calculation means according to claim 10.

According to Embodiment 2 a configuration is adopted in which, first, the ECU 50 calculates the base applied voltage Vb by the applied voltage calculation processing, next, the ECU 50 calculates the final applied voltage V by taking the base applied voltage Vb as an initial value by executing the voltage optimization processing and the arc discharge prevention processing, and the applied voltage V is then applied between the electrodes 62 and 64. However, the present invention is not limited thereto. For example, a configuration may also be adopted in which the ECU 50 only executes the applied voltage calculation processing, and applies the base applied voltage Vb as it is between the electrodes 62 and 64. Further, a configuration may also be adopted in which, after executing the applied voltage calculation processing, only either one of the voltage optimization processing and the arc discharge prevention processing is executed, and the other processing is omitted. Even in a case where only some of the processing is executed in this manner, the effects of each kind of processing can be exerted, respectively.

Further, according to the present invention a configuration may also be adopted which performs the arc discharge prevention processing described in Embodiment 2 in addition to the applied voltage control (steps 106 to 110 in FIG. 9) of Embodiment 1. In this case, it is sufficient to substitute the applied voltage V calculated in step 108 in FIG. 9 with the assumed voltage Vb2 in step 216 in FIG. 19, and execute the arc discharge prevention processing of steps 216 to 230. Thus, the effect of the arc discharge prevention processing can be also added to the applied voltage control of Embodiment 1.

Further, according to Embodiment 2, in the applied voltage calculation processing, a configuration is adopted that lowers the applied voltage as the PM amount contained in the exhaust gas increases. However, a feature of the present invention is that the PM amount contained in exhaust gas is used as a parameter for controlling an applied voltage, and the present invention includes arbitrary applied voltage control that is performed based on the PM amount. Hence, the present invention is not limited to a configuration that lowers the applied voltage as the PM amount increases, and a configuration may also be adopted that, as necessary, raises the applied voltage as the PM amount increases. Furthermore, a configuration may be adopted that lowers or raises the applied voltage only in a case where the PM amount is within a specific range.

Embodiment 3

Figure 22:
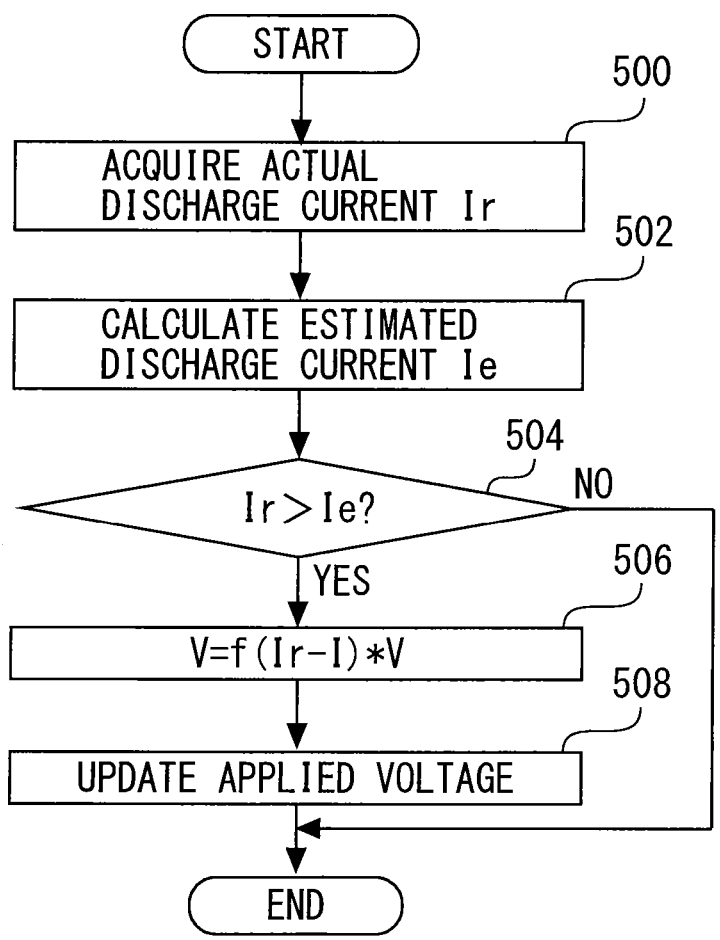
FIG. 22 is a flowchart showing applied voltage correction control that is executed by the ECU in Embodiment 3 of the present invention.

Next, Embodiment 3 of the present invention is described referring to FIG. 22. A feature according to the present embodiment is that, with respect to the above described Embodiment 2, an actual discharge current during a corona discharge is detected, and the applied voltage is corrected based on a difference between the actual discharge current and the estimated discharge current. In the present embodiment, components that are the same as in the above described Embodiment 1 are denoted by the same reference symbols, and a description of such components is omitted.

Feature of Embodiment 3

According to the present embodiment, a discharge current (actual discharge current) Ir that actually arises during a corona discharge is detected. Further, the ECU 50 calculates an estimated discharge current Ie by the above described discharge current estimation processing based on the maximum applied voltage V2 (see the above described FIG. 19) within a voltage range that does not generate an arc discharge and the PM amount contained in the exhaust gas. Further, if the actual discharge current Ir is greater than the estimated discharge current Ie, the ECU 50 calculates a correction amount f(Ir−Ie) of the applied voltage based on the difference (Ir−Ie) between the aforementioned current values, and corrects the applied voltage V based on the correction amount f(Ir−Ie).

Here, the correction amount f(Ir−Ie) is a correction factor for decreasing the applied voltage. The correction amount f(Ir−Ie) is previously set as a function that decreases within the range of 0 to 1 as the difference (Ir−Ie) between the aforementioned current values increases. The applied voltage V is corrected as shown in the following equation (6) based on the correction amount f(Ir−Ie).

$$V_{after\ correction} = f(Ir-Ie) \times V_{before\ correction} \quad (6)$$

Specific Processing to Realize Embodiment 3

Next, specific processing to realize the above described control is described referring to FIG. 22. FIG. 22 is a flowchart showing applied voltage correction control that is executed by the ECU in Embodiment 3 of the present invention. The routine shown in FIG. 22 is repeatedly executed during operation of the engine concurrently with the applied voltage control described in Embodiment 2. According to the routine shown in FIG. 22, first, in step 500, the ECU 50 detects the actual discharge current Ir during a corona discharge by means of the discharge current detection circuit 50B. Further, in step 502, the ECU 50 calculates the estimated discharge current Ie based on the maximum applied voltage V2 calculated by the above described arc discharge prevention processing, and the PM amount calculated by the PM amount calculation processing. Next, in step 504, the ECU 50 determines whether or not the actual discharge current Ir is greater than the estimated discharge current Ie. If the result determined in step 504 is affirmative, in step 506 the ECU 50 calculates the correction amount f(Ir−Ie) and corrects the applied voltage V by means of the above described equation (6). Thereafter, in step 508, the ECU 50 updates the applied voltage V to the corrected value.

According to the above described configuration, when it is determined that the discharge radius Rb is close to the pipe diameter R based on the actual discharge current Ir, the applied voltage V can be decreased by the correction amount f(Ir−Ie) that is calculated according to the difference (Ir−Ie) between the actual discharge current Ir and the estimated discharge current Ie. It is thereby possible to feed back an error included in the estimated discharge current Ie to the applied voltage V, and correct the applied voltage V to a more appropriate value.

DESCRIPTION OF REFERENCE NUMERALS

10 engine (internal combustion engine), 12 piston, 14 combustion chamber, 16 crankshaft, 18 intake passage, 20 exhaust passage, 22 throttle valve, 24 exhaust emission control device, 26 in-cylinder fuel injection valve, 28 spark plug, 30 intake valve, 32 exhaust valve, 34 crank angle sensor, 36 airflow sensor, 38 water temperature sensor, 40 exhaust gas temperature sensor, 42 air-fuel ratio sensor (air-fuel ratio detection means), 50 ECU, 50A applied voltage control circuit, 50B discharge current detection circuit, 60 housing, 62, 64 electrodes, 66 insulator, 68 electrode support portion, K1 air-fuel ratio boundary value

The invention claimed is:

1. A control apparatus for an internal combustion engine, comprising:
   an exhaust emission control device that includes a corona discharge portion that generates a corona discharge in an exhaust passage of the internal combustion engine, and that purifies particulate matter contained in exhaust gas by a corona discharge;
   air-fuel ratio detection means that detects an exhaust air-fuel ratio; and
   electricity supply control means that supplies electricity to the corona discharge portion of the exhaust emission control device, and controls a state of an electricity supply to the corona discharge portion based on the exhaust air-fuel ratio;
   wherein the electricity supply control means comprises applied voltage control means that, only in a rich region in which the exhaust air-fuel ratio is on a rich side of a theoretical air-fuel ratio, controls an applied voltage that is applied to the corona discharge portion.

2. A control apparatus for an internal combustion engine, comprising:
   an exhaust emission control device that includes a corona discharge portion that generates a corona discharge in an exhaust passage of the internal combustion engine, and that purifies particulate matter contained in exhaust gas by a corona discharge;
   air-fuel ratio detection means that detects an exhaust air-fuel ratio; and
   electricity supply control means that supplies electricity to the corona discharge portion of the exhaust emission control device, and controls a state of an electricity supply to the corona discharge portion based on the exhaust air-fuel ratio;
   wherein the electricity supply control means comprises discharge current control means that, only in a lean region in which the exhaust air-fuel ratio is on a lean side of a theoretical air-fuel ratio, controls a discharge current that flows to the corona discharge portion.

3. The control apparatus for an internal combustion engine according to claim 1, wherein the applied voltage control means is configured to lower the applied voltage as the exhaust air-fuel ratio becomes richer within the rich region.

4. The control apparatus for an internal combustion engine according to claim 1, wherein the electricity supply control means comprises discharge current control means that, only in a lean region in which the exhaust air-fuel ratio is on a lean side of a theoretical air-fuel ratio, controls a discharge current that flows to the corona discharge portion.

5. The control apparatus for an internal combustion engine according to claim 2, wherein the discharge current control means is configured to decrease the discharge current as the exhaust air-fuel ratio becomes leaner within the lean region.

6. The control apparatus for an internal combustion engine according to claim 2, wherein the discharge current control means has an air-fuel ratio boundary value that is a predetermined air-fuel ratio within the lean region, and is configured to increase the discharge current as the exhaust air-fuel ratio becomes leaner in a case where the exhaust air-fuel ratio is between the theoretical air-fuel ratio and the air-fuel ratio boundary value, and to decrease the discharge current as the exhaust air-fuel ratio becomes leaner in a case where the exhaust air-fuel ratio is on a lean side of the air-fuel ratio boundary value.

7. The control apparatus for an internal combustion engine according to claim 1, further comprising:
   PM amount calculation means that calculates a PM amount that is an amount of particulate matter contained in exhaust gas, based on at least an exhaust air-fuel ratio, an engine temperature, and a fuel injection timing;
   wherein the applied voltage control means is configured to calculate the applied voltage based on the PM amount.

8. The control apparatus for an internal combustion engine according to claim 7, further comprising:
   discharge current estimation means that estimates a discharge current that flows when an assumed voltage is applied to the corona discharge portion, based on at least the assumed voltage and the PM amount;
   wherein the applied voltage control means is configured to calculate an assumed voltage at a time that an estimated value of the discharge current satisfies a required value that is necessary for purification of particulate matter as an actual applied voltage.

9. The control apparatus for an internal combustion engine according to claim 1, further comprising arc discharge prevention means that limits an applied voltage that is applied to the corona discharge portion to a voltage range in which an arc discharge does not occur.

10. The control apparatus for an internal combustion engine according to claim 9, further comprising:
    PM amount calculation means that calculates a PM amount that is an amount of particulate matter contained in exhaust gas, based on at least an exhaust air-fuel ratio, an engine temperature, and a fuel injection timing; and
    discharge distance calculation means that, in a case where an assumed voltage is applied between two electrodes comprising the corona discharge portion, calculates a range of a discharge that arises from one of the electrodes towards another of the electrodes, based on at least the assumed voltage and the PM amount;
    wherein the arc discharge prevention means is configured to limit the applied voltage based on an assumed voltage at a time that the range of the discharge becomes equal to an inter-electrode distance between the respective electrodes.

11. A control apparatus for an internal combustion engine, comprising:

an exhaust emission control device that includes a corona discharge portion that generates a corona discharge in an exhaust passage of the internal combustion engine, and that purifies particulate matter contained in exhaust gas by a corona discharge;

air-fuel ratio sensor that detects an exhaust air-fuel ratio; and electricity supply control unit that supplies electricity to the corona discharge portion of the exhaust emission control device, and controls a state of an electricity supply to the corona discharge portion based on the exhaust air-fuel ratio;

wherein the electricity supply control unit comprises applied voltage control unit that, only in a rich region in which the exhaust air-fuel ratio is on a rich side of a theoretical air-fuel ratio, controls an applied voltage that is applied to the corona discharge portion.

12. A control apparatus for an internal combustion engine, comprising:

an exhaust emission control device that includes a corona discharge portion that generates a corona discharge in an exhaust passage of the internal combustion engine, and that purifies particulate matter contained in exhaust gas by a corona discharge;

air-fuel ratio sensor that detects an exhaust air-fuel ratio; and electricity supply control unit that supplies electricity to the corona discharge portion of the exhaust emission control device, and controls a state of an electricity supply to the corona discharge portion based on the exhaust air-fuel ratio;

wherein the electricity supply control unit comprises discharge current control unit that, only in a lean region in which the exhaust air-fuel ratio is on a lean side of a theoretical air-fuel ratio, controls a discharge current that flows to the corona discharge portion.

* * * * *